(12) United States Patent
Amanov et al.

(10) Patent No.: US 12,544,060 B2
(45) Date of Patent: Feb. 10, 2026

(54) SYSTEM, APPARATUS, AND METHOD FOR SUTURING

(71) Applicants: Vanderbilt University, Nashville, TN (US); Virtuoso Surgical, Inc., Nashville, TN (US)

(72) Inventors: Ernar Amanov, Nashville, TN (US); Dominick Ropella, Nashville, TN (US); Naren Nimmagadda, Nashville, TN (US); Nicholas Kavoussi, Nashville, TN (US); Neal Dillon, Nashville, TN (US); Richard Hendrick, Nashville, TN (US); Stanley Herrell, Nashville, TN (US); Robert Webster, Nashville, TN (US)

(73) Assignees: VANDERBILT UNIVERSITY, Nashville, TN (US); VIRTUOSO SURGICAL, INC., Nashville, TN (US)

( * ) Notice: Subject to any disclaimer, the term of this patent is extended or adjusted under 35 U.S.C. 154(b) by 613 days.

(21) Appl. No.: 17/910,735

(22) PCT Filed: Mar. 9, 2021

(86) PCT No.: PCT/US2021/021490
§ 371 (c)(1),
(2) Date: Sep. 9, 2022

(87) PCT Pub. No.: WO2021/183501
PCT Pub. Date: Sep. 16, 2021

(65) Prior Publication Data
US 2023/0134917 A1 May 4, 2023

Related U.S. Application Data

(60) Provisional application No. 62/986,999, filed on Mar. 9, 2020.

(51) Int. Cl.
A61B 17/04 (2006.01)
A61B 1/015 (2006.01)
(Continued)

(52) U.S. Cl.
CPC .......... *A61B 17/0469* (2013.01); *A61B 1/015* (2013.01); *A61B 1/053* (2013.01);
(Continued)

(58) Field of Classification Search
CPC .......... A61B 17/00234; A61B 17/0469; A61B 17/0482; A61B 17/0483; A61B 17/0485;
(Continued)

(56) References Cited

U.S. PATENT DOCUMENTS 6,719,763 B2 * 4/2004 Chung ............... A61B 17/0469
606/139
9,936,943 B1 4/2018 Mancini
(Continued)

OTHER PUBLICATIONS

International Search Report and Written Opinion mailed May 26, 2021 for corresponding International Application No. PCT/US21/21490.

*Primary Examiner* — Kevin T Truong
(74) *Attorney, Agent, or Firm* — Tarolli, Sundheim, Covell & Tummino LLP

(57) ABSTRACT

A surgical system, method, and apparatus for suturing a first anatomical structure to a second anatomical structure of a subject includes an endoscope tube for being advanced through a lumen of the first anatomical structure to a surgical site near the second anatomical structure. A manipulator arm extends through the endoscope tube to the surgical site, and includes a first concentric tube manipulator with an end effector configured to grasp and manipulate a suture at the surgical site. A needle arm extends through the endoscope tube to the surgical site, and includes a second concentric tube manipulator with a needle tip configured to pierce the
(Continued)

tissue of the first and second anatomical structures. The needle arm is also configured to grasp the suture and to retract and pull the suture through the pierced tissue so that the suture extends through and forms stitching that stitches together the first and second anatomical structures.

21 Claims, 14 Drawing Sheets

(51) Int. Cl.
  *A61B 1/05* (2006.01)
  *A61B 17/29* (2006.01)
  *A61B 34/30* (2016.01)
  *A61B 17/00* (2006.01)
(52) U.S. Cl.
  CPC .............. *A61B 17/29* (2013.01); *A61B 34/30* (2016.02); *A61B 2017/00353* (2013.01); *A61B 2017/2926* (2013.01)
(58) Field of Classification Search
  CPC .............. A61B 17/29; A61B 17/32056; A61B 2017/00353; A61B 2017/00358; A61B 2017/00477; A61B 2017/06042; A61B 2017/06066; A61B 2017/061; A61B 2017/06176; A61B 2017/1132; A61B 2017/2926; A61B 1/00101; A61B 1/00147; A61B 1/00154; A61B 1/015; A61B 1/018; A61B 1/042; A61B 1/053; A61B 1/0676; A61B 1/0684; A61B 34/30
  See application file for complete search history.

(56) References Cited

U.S. PATENT DOCUMENTS

| | | | |
|---|---|---|---|
| 2002/0116011 A1 | 8/2002 | Chee | |
| 2003/0139752 A1* | 7/2003 | Pasricha | A61B 17/0483 606/139 |
| 2007/0249897 A1* | 10/2007 | Miyamoto | A61B 1/0055 600/104 |
| 2010/0152751 A1* | 6/2010 | Meade | A61B 34/30 606/144 |
| 2012/0157765 A1 | 6/2012 | Mitelberg | |
| 2014/0005480 A1* | 1/2014 | Wagner | A61B 1/005 600/123 |
| 2014/0039527 A1* | 2/2014 | Avelar | A61B 34/74 606/144 |
| 2014/0222033 A1* | 8/2014 | Foerster | A61B 17/0469 606/144 |
| 2015/0080650 A1* | 3/2015 | Dejima | A61B 1/00135 600/102 |
| 2017/0095299 A1 | 4/2017 | Hendrick et al. | |
| 2018/0116652 A1* | 5/2018 | Torrie | A61B 17/06109 |
| 2019/0321028 A1* | 10/2019 | Dinino | A61B 17/0485 |

* cited by examiner

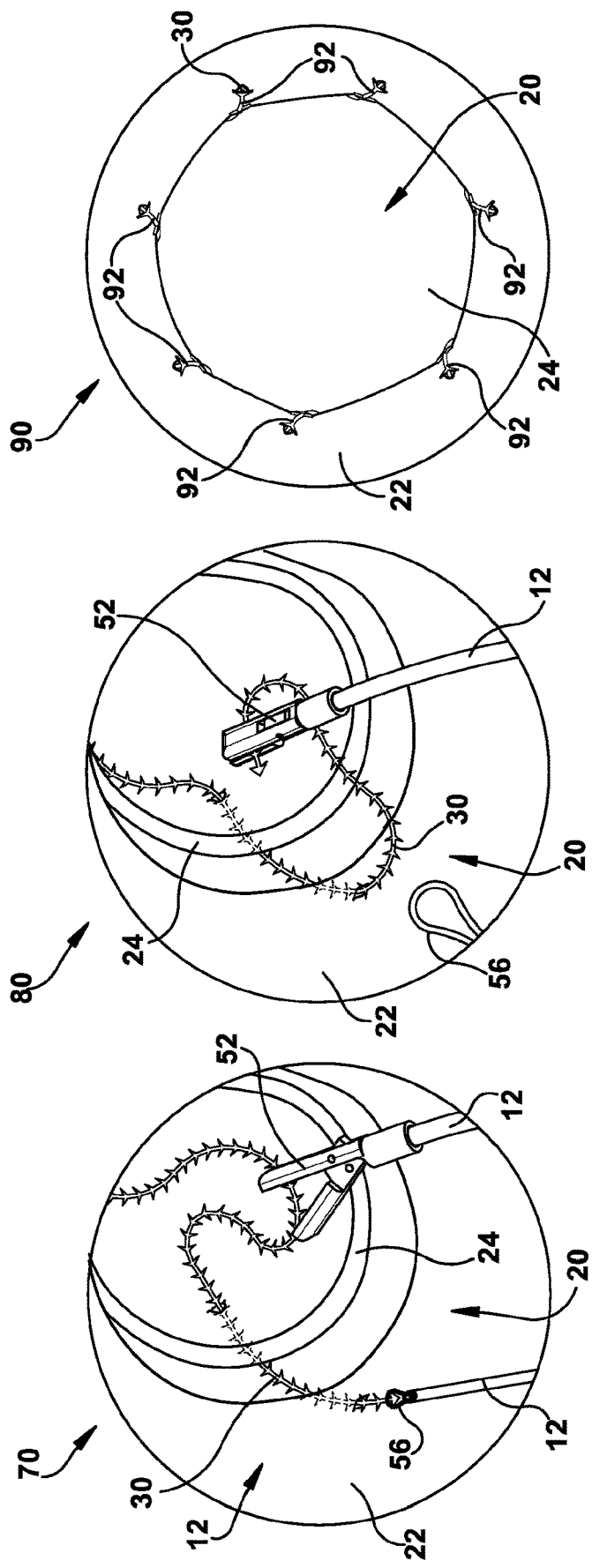

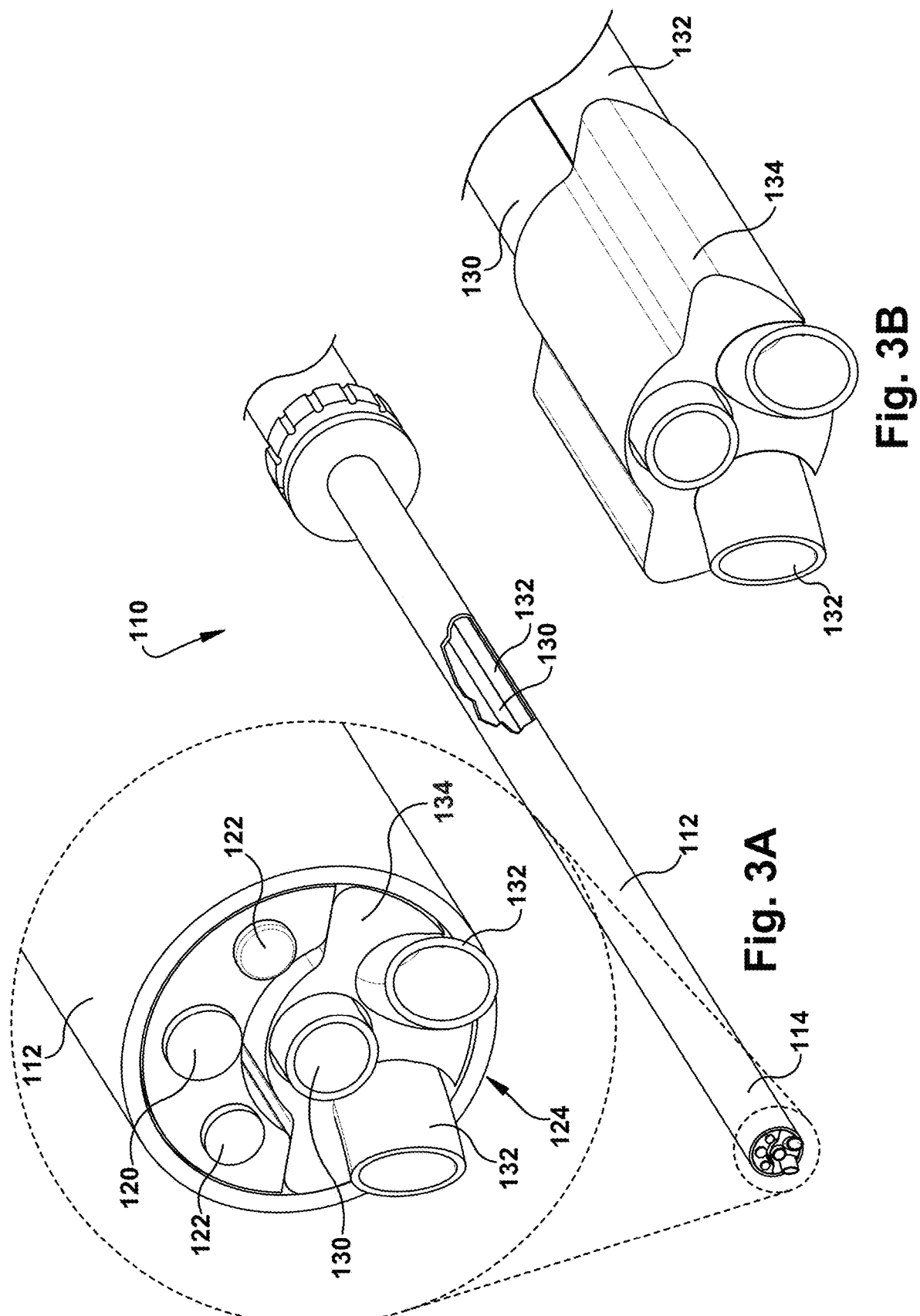

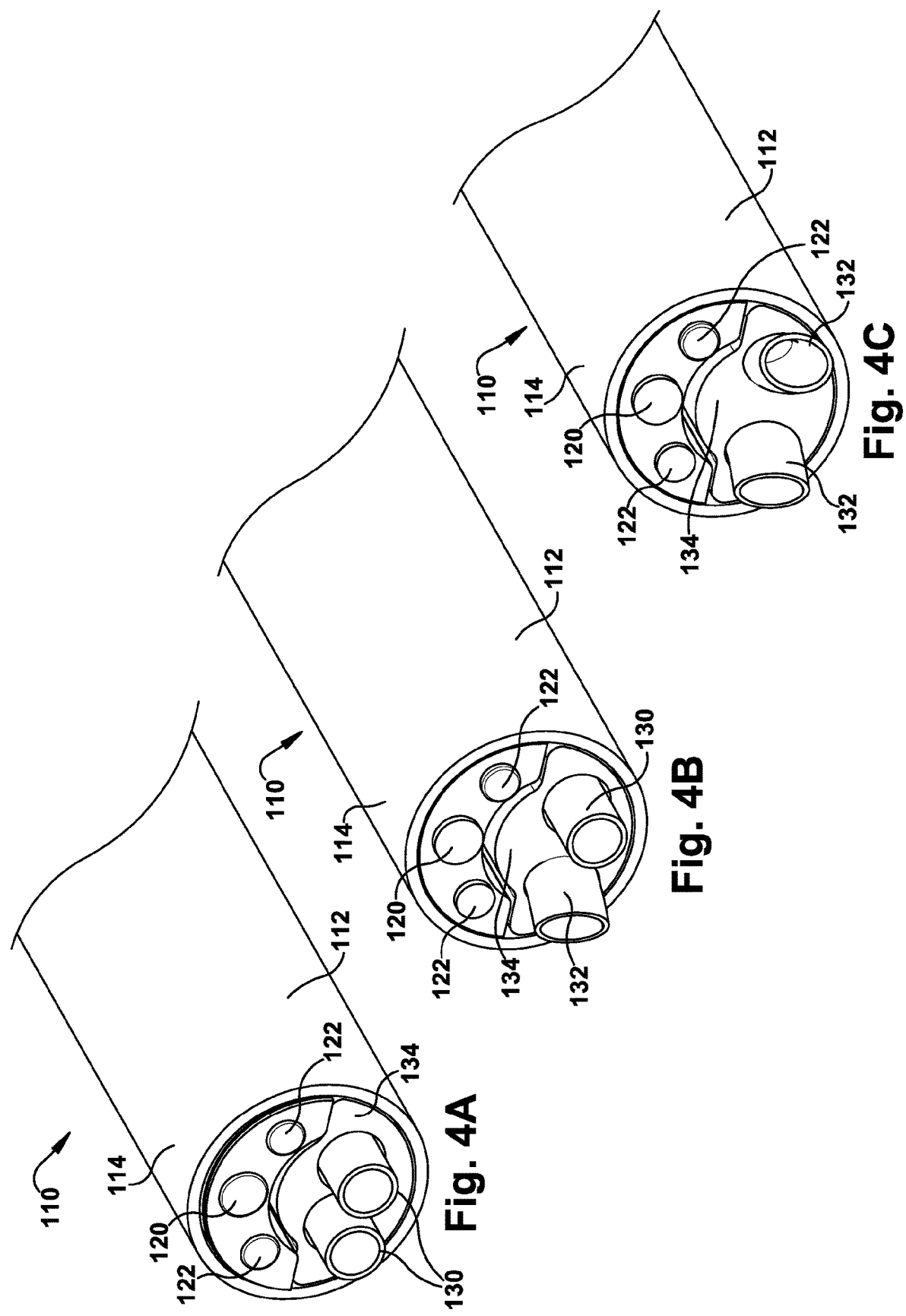

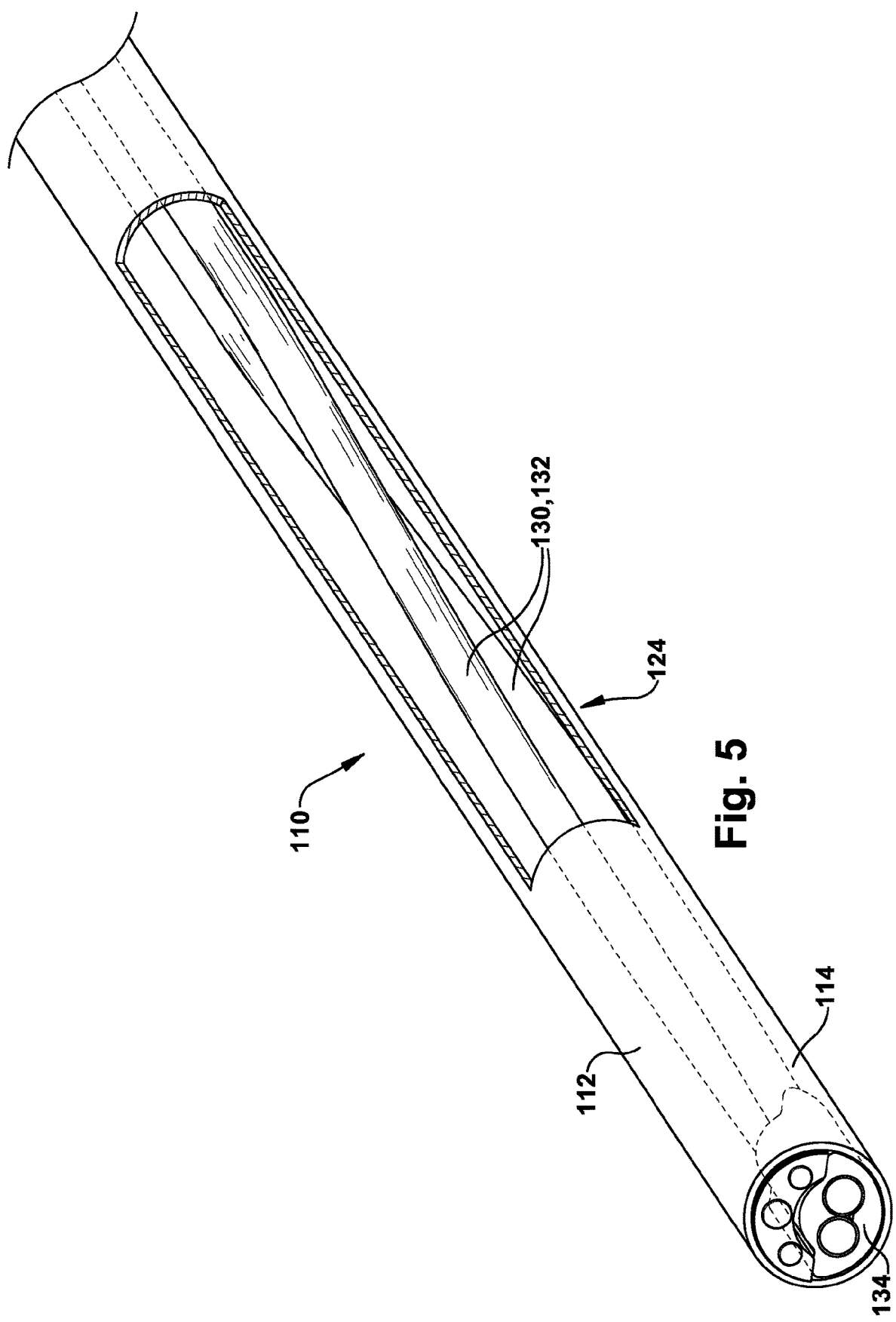

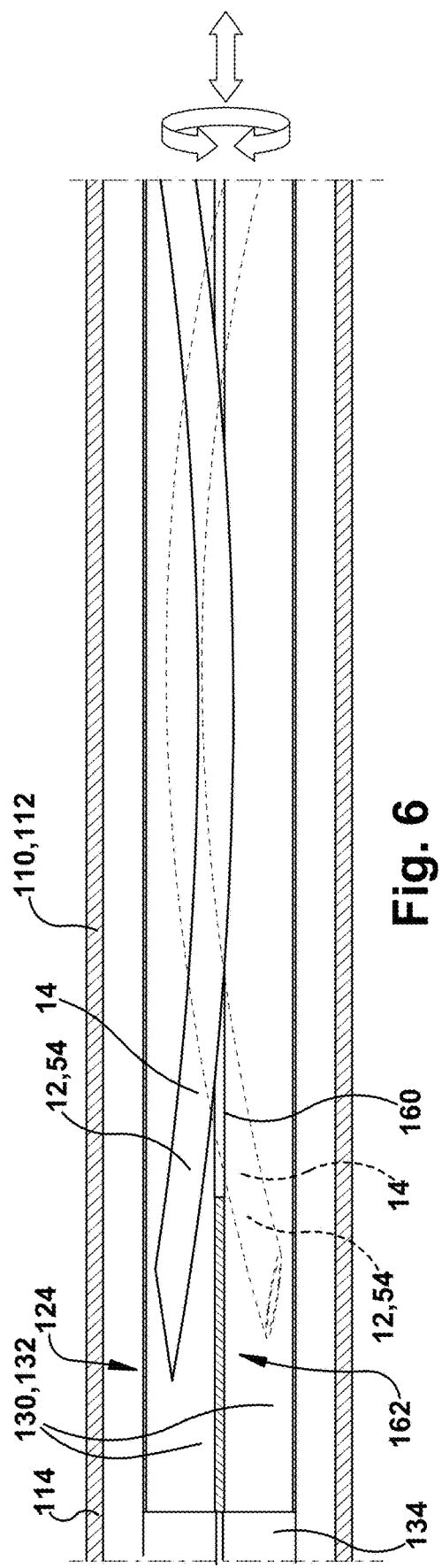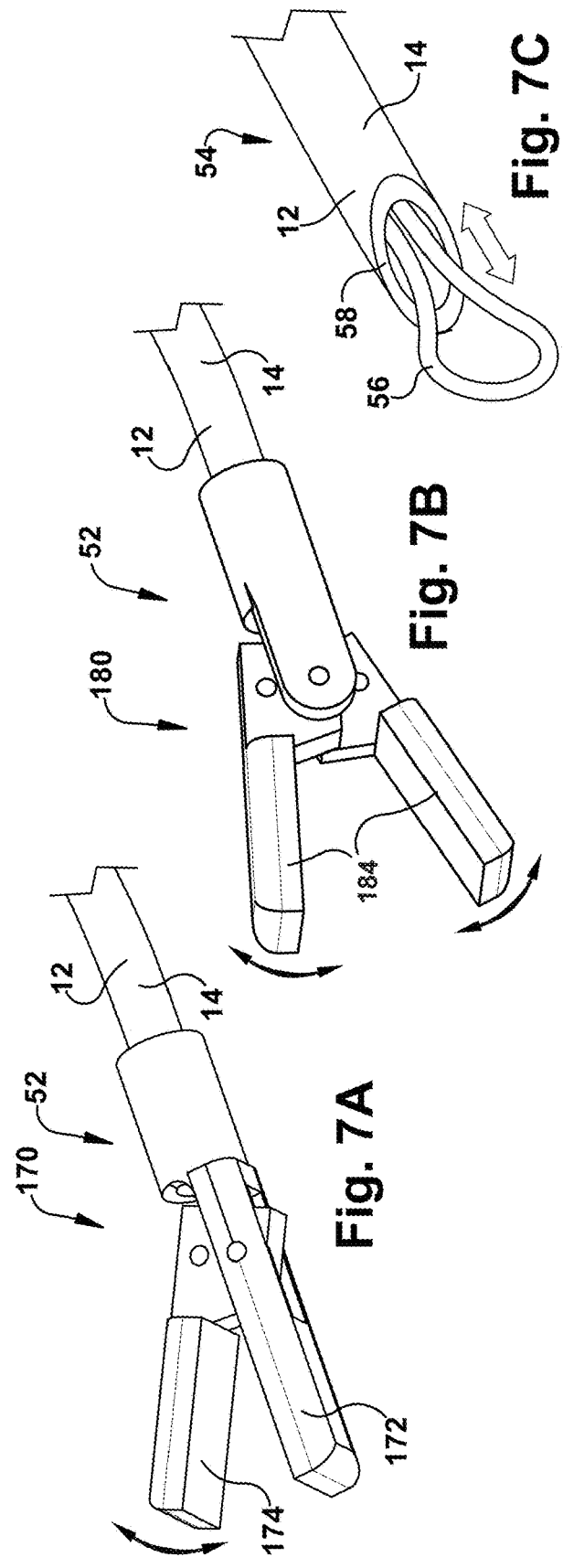

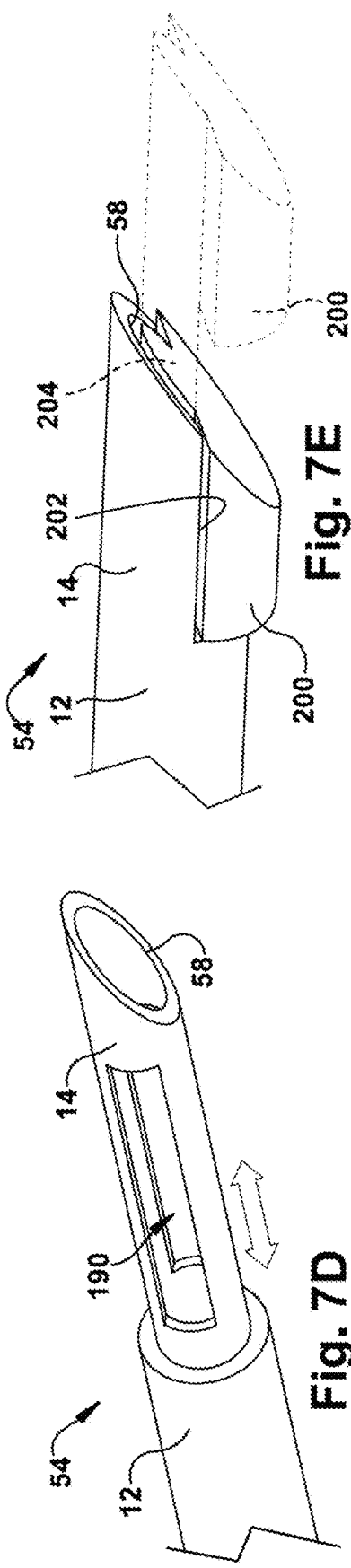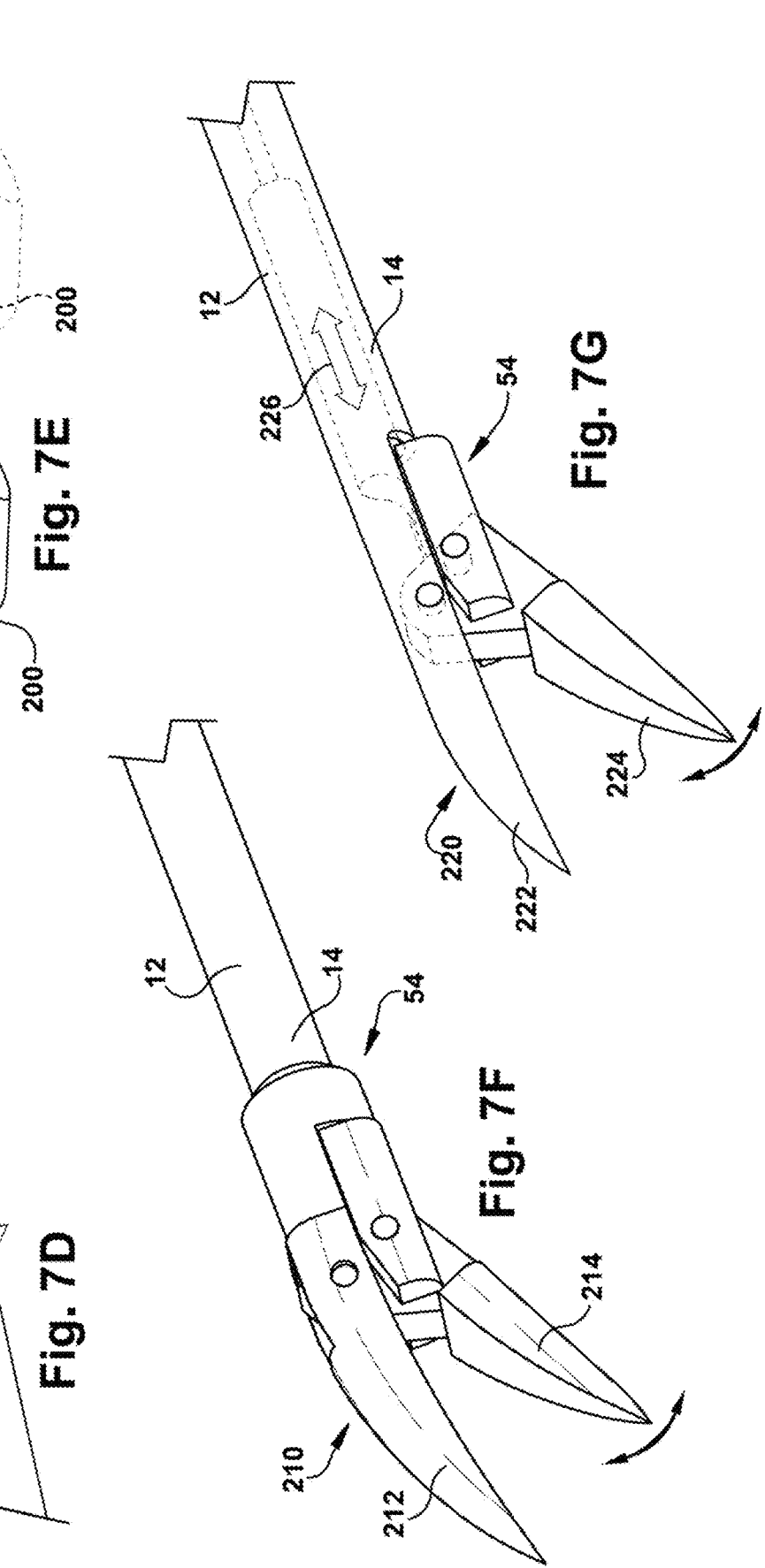

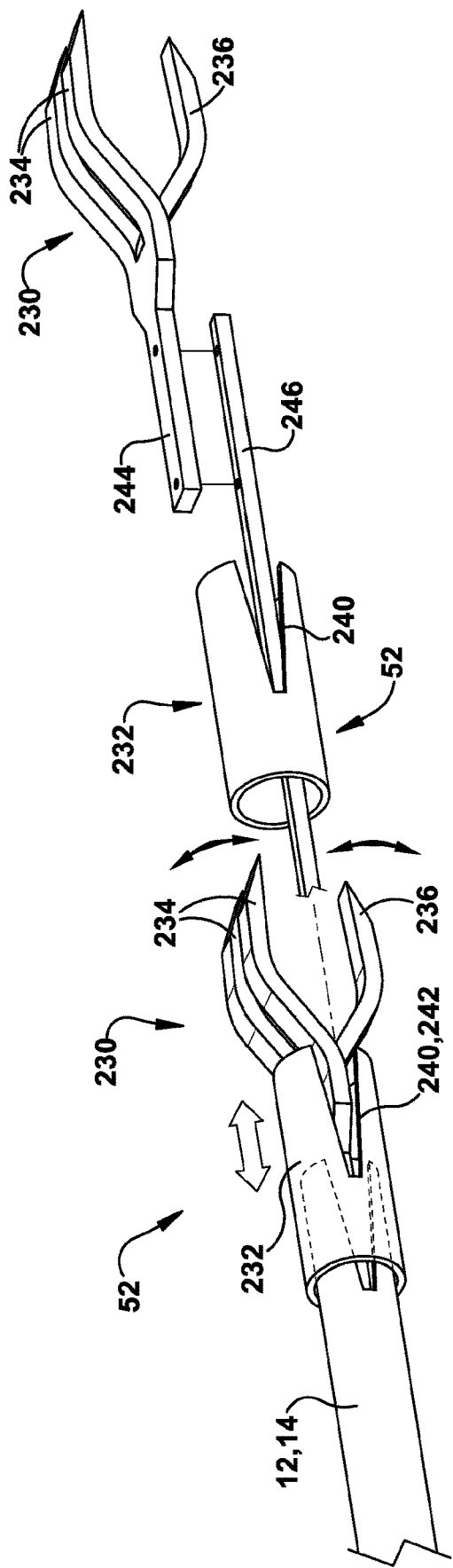
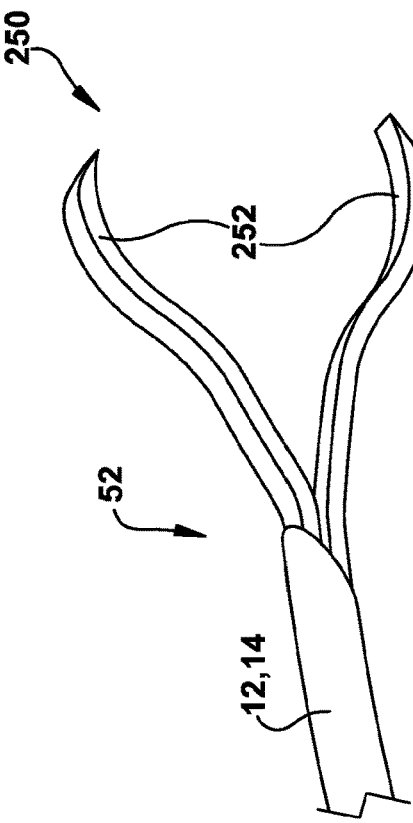
Fig. 7J
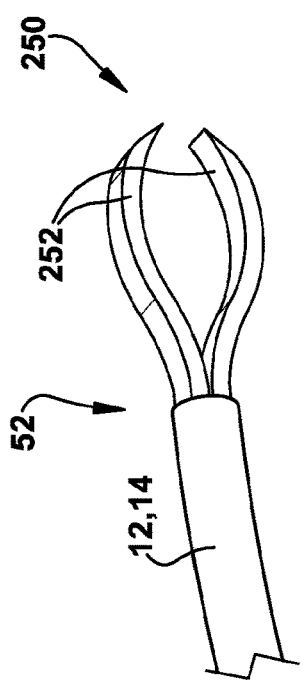
Fig. 7I
Fig. 7H

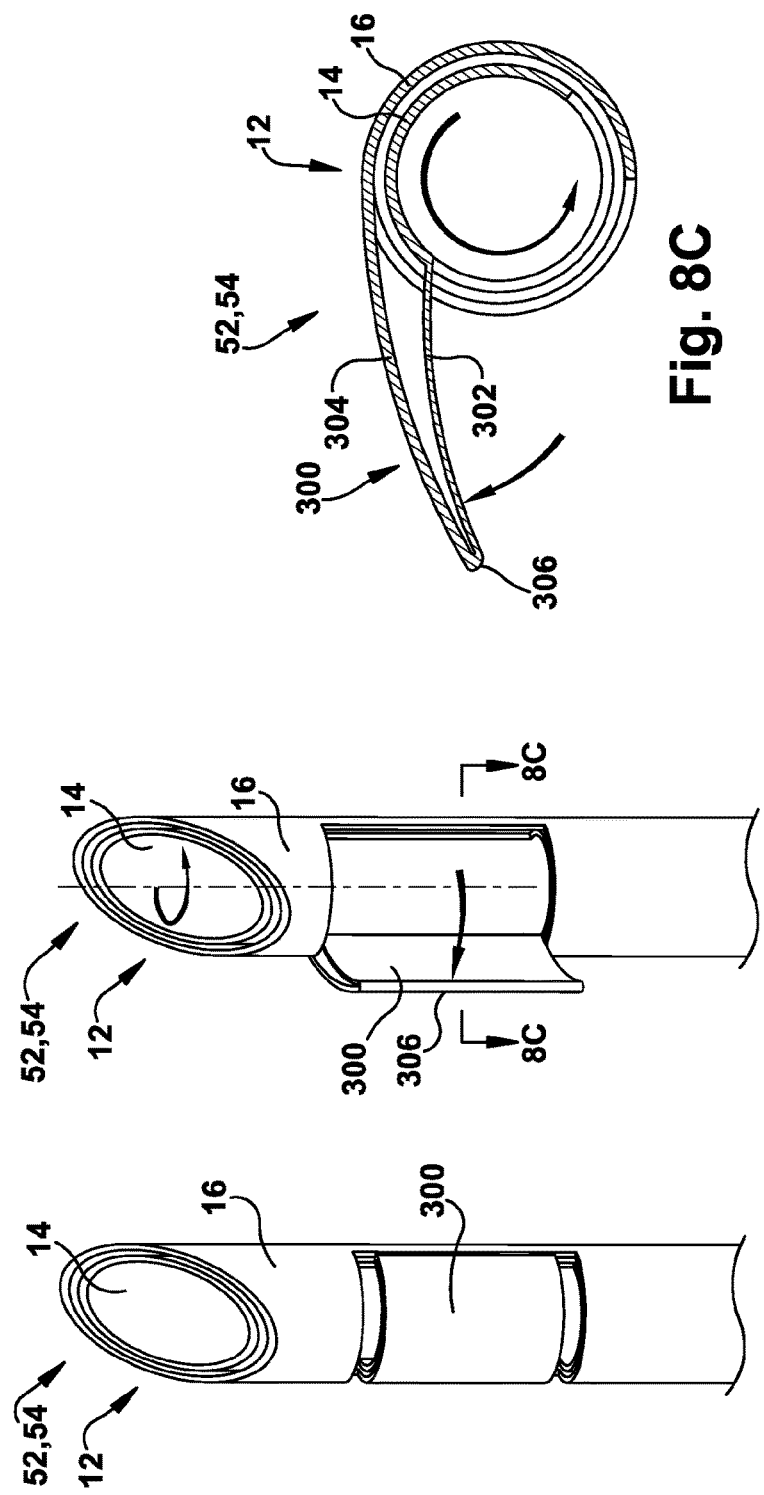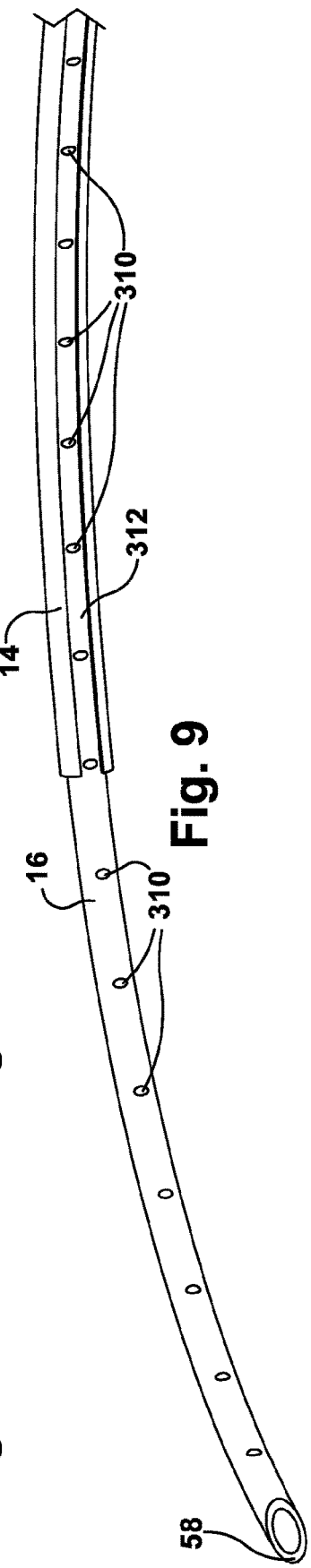
Fig. 8A
Fig. 8B
Fig. 8C
Fig. 9

SYSTEM, APPARATUS, AND METHOD FOR SUTURING

RELATED APPLICATION

This application claims the benefit of U.S. Provisional Application Ser. No. 62/986,999, filed on Mar. 9, 2020, the subject matter of which is hereby incorporated by reference in its entirety.

GOVERNMENT FUNDING STATEMENT

This invention was made with government support under R01 EB026901 awarded by the National institutes of Health. The government has certain rights in the invention.

BACKGROUND

Within the field of medicine, there is a growing trend favoring minimally invasive procedures over traditional open surgery procedures. Minimally invasive surgery can be performed through one or more small incisions and/or a natural body orifice using, for example, an endoscope or laparoscope to deliver surgical tools to a surgical site. Favorably, minimally invasive surgery can involve less patient pain, lower risk of infection, shorter hospital stays, quicker recovery time, less scarring, and reduced blood loss when compared to traditional open surgery.

For example, prostate cancer is the most prevalent cancer in men and is often treated via radical prostatectomy. Taking a minimally invasive surgical approach, radical prostatectomy is typically performed transabdominally utilizing an endoscopic procedure, often with the aid of a robotic surgical system, such as the da Vinci Surgical System. The radical prostatectomy requires mobilizing the prostate via dissection/retraction of surrounding anatomical support structures, nerves, and blood vessels. After prostate removal, an anastomosis is performed to re-connect the bladder to the urethra.

Complications including incontinence and impotence are known to occur following surgery, and have been reported to be as high as 70% for erectile dysfunction and 21% for urinary incontinence, and although outcomes of specific hospitals and specific surgeons vary widely, some level of these complications is intrinsic to the procedure as currently performed. It has been hypothesized by surgeons that the required dissection and retraction of nerves and other structures may be largely responsible for these complications, and transurethral approaches have been attempted with straight, rigid laparoscopic instruments. The main conclusion of these studies, which included a small number of clinical cases, was that more dexterous tools are needed, particularly to enhance reconstructive suturing.

SUMMARY

A system, apparatus, and method applies sutures in a minimally invasive manner using an endoscope or other similar tubular structure. To enable this minimally invasive approach, the suture is introduced through a guiding channel of the endoscope to the surgical site inside the body. In one implementation, a dissolvable/absorbable suture with an anchor, which allows for fixation on one end, is utilized. This suture can be of the barbed type, which allows the suture to hold the tissue once the suture is passed through. With this barbed suture structure, knots are not necessary, as the barbs hold the sutured tissue together. Non-barbed sutures can also be used, but require that a knot be tied in order to maintain tension.

According to the system, apparatus, and method, the sutures are applied using concentric tube manipulators that extend through guiding channels of the endoscope. Each concentric tube manipulator includes a concentric tube structure including two or more pre-curved tubes, made of nitinol or other materials with super elastic qualities, that are nested inside each other. The tubes can be rotated and translated independently in order to produce dexterity at the tip of the concentric tube manipulator. The rotational and translational movement of the tubes can be imparted manually, robotically, or both manually and robotically.

The manipulator function of the concentric tube manipulators can be implemented by providing a structure, such as a grasper or tweezer, at the distal end of the concentric tube structure. In this implementation, an actuator member, such as a wire or cable, can be fed through the inner lumen of the concentric tube structure and can selectively actuate, e.g., via tension, the manipulator in order to manipulate tissue and/or other objects at the surgical site. The manipulator function can also be implemented via the tip of the concentric tube structure itself, e.g., for probing or piercing tissue. According to this function, the manipulator can, for example, be used to apply sutures, as described herein. In this regard, a concentric tube manipulator can be configured to deliver the suture through the endoscope tube to the surgical site.

In one particular configuration, the system, apparatus, and method can include two concentric tube manipulators: a needle arm and a manipulator arm. The needle arm is used primarily for piercing tissue, grasping the suture, and pulling the suture through the pierced tissue to perform the suturing operation. The manipulator arm is used to perform a variety of manipulating functions—manipulating tissue, the suture, surgical tools or even manipulating the needle arm. To facilitate this function, the manipulating arm can include a manipulator, such as a grasping tool (e.g., a claw, hook, snare, etc.).

In one particular application, the system, apparatus, and method can be used to apply sutures from within a body lumen to suture the lumen to a connected structure. In one specific implementation, the system, apparatus, and method can be used to perform a trans-urethral radical prostatectomy and anastomotic suturing procedure. In a tissue removal phase, the radical prostatectomy is performed to remove the prostate. Once the prostate is removed, a reconstructive anastomosis of bladder to urethra is performed from inside the lumen, i.e., from inside the urethra. Advantageously, the concentric tube manipulator suturing capabilities of the system, apparatus, and method disclosed herein allows using for this trans-urethral endoscopic reconstructive anastomosis of the bladder to urethra.

Of course, the utility of the system, apparatus, and method disclosed herein is not limited to the aforementioned trans-urethral endoscopic reconstructive anastomosis of the bladder to urethra in radical prostatectomy procedures. It will be appreciated that the system, apparatus, and method disclosed herein will be applicable and beneficial to suturing in a wide variety of surgical procedures.

According to one aspect, a surgical system for suturing a first anatomical structure to a second anatomical structure of a subject includes an endoscope tube configured to be advanced through a lumen of the first anatomical structure to a surgical site near the second anatomical structure. A manipulator arm extends through the endoscope tube to the surgical site, and includes a first concentric tube manipulator with an end effector configured to grasp and manipulate a suture at the surgical site. A needle arm extends through the endoscope tube to the surgical site, and includes a second concentric tube manipulator with a needle tip configured to pierce the tissue of the first and second anatomical structures. The needle arm is configured to grasp the suture and to retract and pull the suture through the pierced tissue so that the suture extends through and forms stitching that stitches together the first and second anatomical structures.

According to another aspect, the manipulator arm can be configured to grasp the suture and pull on the suture to draw together portions of the first and second anatomical structures and tighten the stitching.

According to another aspect, the needle arm can be configured to pierce through the tissue of the first anatomical structure from within the lumen of the first anatomical structure, to exit the first anatomical structure and be positioned outside the second anatomical structure, and to pierce the second anatomical structure and enter second anatomical structure from outside the second anatomical structure.

According to another aspect, the needle arm can be configured to follow a pre-curved path and extend from the endoscope tube when piercing the tissue of the first and second anatomical structures, and to follow the same curved path and retract into the endoscope tube when pulling the suture through the pierced tissue.

According to another aspect, the manipulator arm can be configured to hold the suture after the needle arm pulls the suture through the pierced tissue while the needle arm pierces through the first and second anatomical structures at different locations, and to manipulate the suture so that the needle arm can grasp the end of the suture and pull the suture through the anatomical structures at the different locations to form another stitch that stitches together the first and second anatomical structures.

According to another aspect, the stitch can be configured to connect the lumen of the first anatomical structure to at least one of a lumen, opening, or ostium of the second anatomical structure.

According to another aspect, the first anatomical structure can be a urethra and the second anatomical structure can be a bladder, wherein the stitching connects a lumen of the urethra to an ostium of the bladder.

According to another aspect, the needle tip of the needle arm can include a hollow tube with a sharpened tip, and the tube can house a snare for grasping the suture. The snare can have various configurations. For example, the snare can include a lasso or grasper.

As another example, the snare can include aligned openings through the sidewall of the tube forming the needle tip of the needle arm. In this configuration, extension and retraction of the needle tip while an item is positioned within one of the openings causes the item to be grasped between the opening and a terminal end portion of a tube of the concentric tube manipulator into which the needle tip is retractable.

As another example, the needle arm can include a chamfered block that is seated in and occupies a notch formed at the needle tip of the needle arm. The block can be actuatable to extend from the notch and retract into the notch. In a retracted position, the block closes the notch and helps define the needle tip. In an extended position, the block extends forward and opens the notch. The block is retractable to clamp down on and retain an item in the notch.

As another example, the needle arm can include grasping jaws that form the needle tip for suturing tissue when in a closed condition. The grasping jaws can have an open condition for receiving an item therebetween and thereafter grasping the item when placed in the closed condition.

As another example, the grasping jaws can include a fixed upper jaw and a pivotable the lower jaw. The upper jaw can be formed by a sharpened portion of the concentric tube forming the needle tip.

As another example, the needle arm can include tweezers positioned in the needle tip and extendable from the needle tip. The tweezers can include tweezer arms that are biased toward an open condition. The tweezers, when extended from the needle tip, place the tweezers in the open condition. The tweezers, when retracted into the needle tip, engage the needle arm and are urged toward a closed tweezer condition.

As another example, the needle arm can include a grasper formed by cutting a sidewall of a distal end of a tube of the needle arm to form a pair of grasping jaws. The sidewall of the tube is also cut to form a joint that facilitates the tube to flex or bend so that the grasping jaws can pivot opened/closed. The grasping jaws are pre-configured to flex outward to an open condition under the resilience of the tube material when extended from an adjacent concentric tube of the needle arm. The grasping jaws are configured to engage the adjacent concentric tube of the needle arm and urged toward a closed condition when retracted into the adjacent concentric tube of the needle arm.

As another example, the needle arm can include a flap grasper formed by cutting aligned flap portions in an outermost tube of the needle arm and an inner tube of the needle arm adjacent the outermost tube. Overlying ends of the flap portions are interconnected. The flap grasper is actuatable to open and close by rotating their respective tubes relative to each other in opposite directions.

The end effector of the manipulator arm can have various configurations. For example, the end effector of the manipulator arm can include forceps comprising one fixed jaw and one actuatable jaw that is pivotable about an axis from an open condition to a closed condition.

As another example, the end effector of the manipulator arm can include forceps including comprising a pair of actuatable jaws that are pivotable about an axis from an open condition to a closed condition.

As another example, the end effector of the manipulator arm can include tweezer-like graspers comprising a pair of grasper arms that are biased toward an open condition. The graspers being extended from the manipulator arm can place the graspers in an open condition. The graspers when retracted into the manipulator arm can be configured to engage the manipulator and urged toward a closed condition. In one configuration, an end cap fitted onto the end of the needle arm can include a V-shaped notch for receiving the graspers and urging the graspers to the closed condition when retracted into the notch. In another configuration, the graspers can be formed from a single sheet of material that is cut to form two upper grasping arms and a single lower grasping arm.

Additionally, the grasping arms can be configured to define a first stage and a second stage of the graspers. The first stage can include proximally located opposed curved portions of the grasper arms. The second stage can include distally located curved portions of the grasper arms. The first stage portions can be smaller in length, curvature, and spacing than the second stage portions.

According to another aspect, the surgical system can also include one or more guide tubes that extend through the endoscope tube and through which the manipulator arm and needle arm extend. In one configuration, at least one guide tube can be a curved guide tube with a curved distal end that protrudes from a distal end of the endoscope tube and is curved away from a central axis of the endoscope tube. The curved guide tube can be configured to guide the needle arm to extend from the endoscope tube in a direction that is outward with respect to the central axis.

In one example configuration, the outward direction at which the curved guide tube guides the needle arm can be configured to direct the needle tip to pierce through the tissue of the first anatomical structure from within the lumen of the first anatomical structure to position the needle tip outside the first and second anatomical structures. The needle arm can be further configured to follow a curved path inward toward the central axis to pierce the second anatomical structure and enter second anatomical structure from outside the second anatomical structure. The needle arm can also be configured to follow the same curved path and retract into the endoscope tube when pulling the suture through the pierced tissue.

In another example configuration, first and second guide tubes can protrude from the distal end of the endoscope tube and can be curved away from a central axis of the endoscope tube in opposite directions. The first and second guide tubes can guide the needle arm to extend from the endoscope tube in opposite directions that are outward with respect to the central axis. The opposite directions can be selected so that the needle arm when extending in a first opposite direction is configured to stitch together corresponding first halves of the first and second anatomical structures, and the needle arm when extending in a second opposite direction is configured to stitch together corresponding second halves of the first and second anatomical structures.

In another example configuration, the first and second guide tubes can include an opening connecting the tubes inside the endoscope. The opening can facilitate the needle arm selectively entering the first and second guide tubes while inside the endoscope.

In another example configuration, the first and second guide tubes can have portions extending within the endoscope tube that follow a helical path configured to facilitate rotation of the guide tubes within the endoscope tube without affecting the positions of their respective distal ends positioned at the tip of the endoscope tube.

According to another aspect, the surgical system can include an adaptor configured to fit into a distal end of the endoscope tube and support the guide tubes.

According to another aspect, at least one of the manipulator arms and the needle arms can include distance measuring indicia on an outer surface of an innermost tube, and a longitudinal slot on an outer tube that facilitates viewing the indicia.

According to another aspect, the surgical system can include an endoscope of which the endoscope tube is a portion. The endoscope can also include a camera for viewing the surgical site and an illumination source for illuminating the surgical site.

In one example configuration, the endoscope can include an optics port that carries the camera and illumination source. The optics port can be extendable from a distal end of the endoscope to adjust the point-of-view of the camera.

In another example configuration, the endoscope can also include an articulated optics structure that carries the camera and illumination source. The optics structure can include one or more segments that pivot or rotate relative to the remainder of the optics structure. The optics structure can be actuatable to adjust the point-of-view of the camera.

According to another aspect, the surgical system can also include an endoscope of which the endoscope tube is a portion, and a robotic assembly to which the endoscope, the manipulator arm, and the needle arm are attached. The robotic assembly can be configured to control the actuation of the manipulator arm and needle arm robotically through translation and rotation of their respective concentric tubes.

According to another aspect, the endoscope can include one or more irrigation ports for providing irrigation fluids to the endoscope tube for delivery to the surgical site. The endoscope can also include optics including a camera for viewing the surgical site and an illumination source for illuminating the surgical site. The robotic assembly can include a linear actuator configured to extend and retract the optics relative to the endoscope in order to position the camera point-of-view distally of the endoscope. The system can also include a deformable sleeve that connects the irrigation ports to the endoscope tube and through which the optics extend. The deformable sleeve can be configured to deform through elongation and compression to facilitate extension and retraction of the optics relative to the endoscope tube while maintaining a fluid-tight connection between the irrigation ports and the endoscope tube.

According to another aspect, the system can also include a suture delivery device including a tube with a lumen configured to receive the suture and retain the suture for delivery endoscopically to the surgical site. The suture delivery device can be configured to receive a leading end of the suture in a delivery device lumen and to secure an anchor end of the suture to retain the suture in the lumen during delivery.

According to another aspect, a method for suturing a first anatomical structure to a second anatomical structure of a subject includes advancing an endoscope tube through a lumen of the first anatomical structure to a surgical site near the second anatomical structure. The method also includes extending a manipulator arm comprising a first concentric tube manipulator through the endoscope tube to the surgical site. The manipulator arm includes an end effector configured to grasp and manipulate a suture at the surgical site. The method also includes extending a needle arm comprising a second concentric tube manipulator through the endoscope tube to the surgical site. The needle arm includes a needle tip configured to pierce the tissue of the first and second anatomical structures. The needle arm is also configured to grasp the suture and to retract and pull the suture through the pierced tissue so that the suture extends through and forms stitching that stitches together the first and second anatomical structures.

According to one implementation, the method can include using the manipulator arm to grasp the suture and pull on the suture to draw together portions of the first and second anatomical structures and tighten the stitching.

According to another implementation, the method can include actuating the needle arm to pierce through the tissue of the first anatomical structure from within the lumen of the first anatomical structure. The method can also include advancing the needle arm through the first anatomical structure to exit the first anatomical structure and become positioned outside the second anatomical structure. The method can further include actuating the needle arm to pierce the second anatomical structure and enter second anatomical structure from outside the second anatomical structure.

According to another implementation, the method can include advancing the needle arm along a curved path from the endoscope tube when piercing the tissue of the first and second anatomical structures, and retracting the needle arm along the same curved path when pulling the suture through the pierced tissue.

According to another implementation, the method can include using the manipulator arm to hold the suture after the needle arm pulls the suture through the pierced tissue while the needle arm pierces through the first and second anatomical structures at different locations. The method can also include using the manipulator arm to manipulate the suture so that the needle arm can grasp the end of the suture and pull the suture through the anatomical structures at the different locations to form another stitch that stitches together the first and second anatomical structures.

According to another implementation, the step of forming stitching that stitches together the first and second anatomical structures can include stitching together the lumen of the first anatomical structure to at least one of a lumen, opening, or ostium of the second anatomical structure.

According to another implementation, the needle tip of the needle arm can include a hollow tube with a sharpened tip. The tube can house a snare for grasping the suture.

According to another implementation, the method can include extending the needle arm from the endoscope tube in a direction that is outward with respect to a central axis of the endoscope tube to direct the needle tip to pierce through the tissue of the first anatomical structure from within the lumen of the first anatomical structure to position the needle tip outside the first and second anatomical structures. The method can also include extending the needle arm to follow a curved path inward toward the central axis to pierce the second anatomical structure and enter second anatomical structure from outside the second anatomical structure. The method can further include retracting the needle arm along the same curved path into the endoscope tube when pulling the suture through the pierced tissue.

According to another aspect, a method for suturing a urethra to an ostium of a bladder of a subject includes advancing an endoscope tube through the urethra to a surgical site near the bladder ostium. The method also includes extending a manipulator arm including a first concentric tube manipulator through the endoscope tube to the surgical site. The manipulator arm includes an end effector configured to grasp and manipulate a suture at the surgical site. The method also includes extending a needle arm including a second concentric tube manipulator through the endoscope tube to the surgical site. The method also includes extending the needle arm along a predetermined curved path to pierce through the urethra from inside the urethra to outside the urethra. The method also includes extending the needle arm along the predetermined curved path to pierce the bladder ostium from outside the ostium to inside the ostium, and grasping the suture via the needle arm. The method also includes retracting the needle arm along the predetermined curved path to pull the suture through the pierced tissue of the ostium from inside the ostium to outside the ostium. The method further includes retracting the needle arm along the predetermined curved path to pull the suture through the pierced tissue of the urethra from outside the urethra to inside the urethra; so that the suture extends through and forms stitching that stitches the urethra to the bladder ostium.

DRAWINGS

The foregoing and other features of the present invention will become apparent to one skilled in the art to which the present invention relates upon consideration of the following description of the invention with reference to the accompanying drawings, in which:

FIGS. 1A-1F illustrate a portion of an apparatus performing surgical suturing procedure at a surgical site in a subject.

FIGS. 3A and 3B illustrate an example configuration of a distal end portion of the apparatus.

FIGS. 4A-4C illustrate different example configurations of the distal end portion of the apparatus.

FIGS. 5-6 illustrates example guide tube configurations of the apparatus.

FIGS. 7A-7L illustrate example configurations of end effectors that can be implemented in the apparatus.

FIGS. 8A-8C illustrate an example configuration of an end effector that can be implemented in the apparatus.

FIG. 9 illustrates an example configuration of indicia that can be implemented in the apparatus.

DESCRIPTION

Figure 1C:
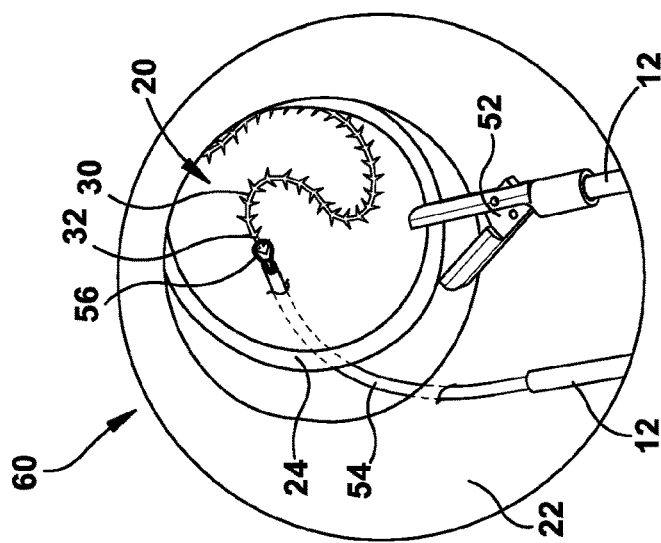

A system, apparatus, and method for suturing implements concentric tube manipulators that are delivered to a surgical site and used to perform suturing techniques, as described herein. Delivery of the concentric tube manipulators can be achieved, for example, using an endoscope, laparoscope, or other similar tubular structure configured to access the surgical site percutaneously or through a natural orifice. For purposes of this disclosure, an endoscopic delivery device is described by way of example. The system, method, and apparatus described herein are not, however, limited to an endoscopic implementation.

Suturing Method

The system, apparatus, and method disclosed herein can be used to apply sutures in a variety of manners, using different types of sutures and/or different suturing techniques. The type of suture selected and the suturing techniques can depend on the particular surgery being performed, the anatomical structures involved, and the preferences of the surgeon performing the surgery.

FIGS. 1A-F illustrate an example implementation in which the system 10 includes apparatus in the form of concentric tube manipulators 12 to perform a suturing method or procedure at a surgical site 20. The suturing method or procedure, generally stated, involves delivering the manipulators 12 through the lumen of a first anatomical structure, and using the manipulators to suture together the first anatomical structure to a second anatomical structure in order to connect the lumen of the first structure to a lumen, opening, or ostium of the second anatomical structure.

In this example implementation, the manipulators 12 are delivered to the surgical site 20 through a body lumen using an endoscope (not shown in FIGS. 1A-F). The system 10 uses the manipulators 12 to perform an anastomosis procedure by which the tissue forming the lumen is attached to an opening or ostium of another anatomical structure. More specifically, in this example implementation, the anastomosis procedure is used to connect the urethra 22 to the bladder ostium 24 after completing a prostatectomy procedure to remove the patient's prostate. The surgical site 20 illustrated in FIGS. 1A-F is at the interface of the urethra 22 and the bladder ostium 24. Advantageously, in this example implementation, the system and apparatus allows the surgeon to perform both the prostatectomy and the anastomosis endoscopically, through the urethra, thereby eliminating the need for incisions to access the surgical site 20.

FIGS. 1A-F illustrate an example implementation of a method by which the urethra to bladder anastomosis can be performed by using the system 10 to deliver and apply a suture 30. The suture 30 can be any suitable suture type, such as that illustrated in FIGS. 1A-F. In the example implementation of FIGS. 1A-F, the suture 30 is a dissolvable/absorbable suture construction with a leading end 32, retention barbs 34 spaced along its length, and a distal anchor 36. As mentioned above, the suture and suturing technique fits the surgical application and the preferences of the surgeon.

The initial step of the urethra to bladder anastomosis is to deliver the endoscope to the surgical site through the lumen of the urethra 22. The views illustrated in FIGS. 1A-F are as-viewed through a camera mounted distally on the endoscope and, therefore, the endoscope is not visible in these figures. The views illustrated in FIGS. 1A-F thus correspond to those that the surgeon would encounter during the procedure.

Figure 1B:
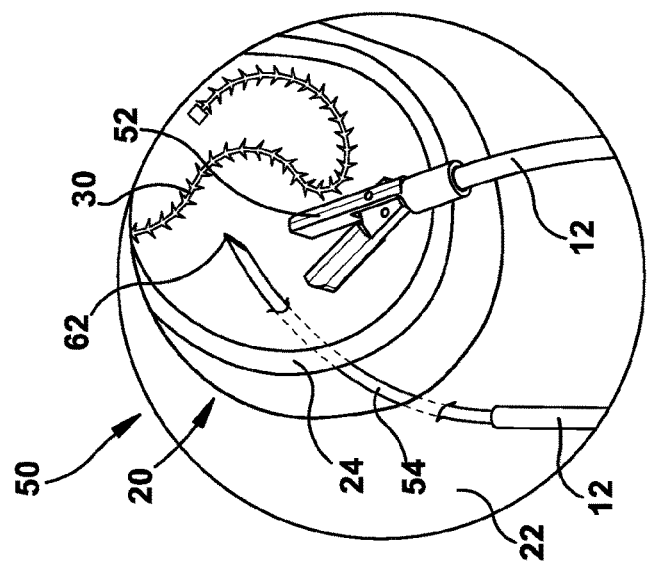
Figure 1A:
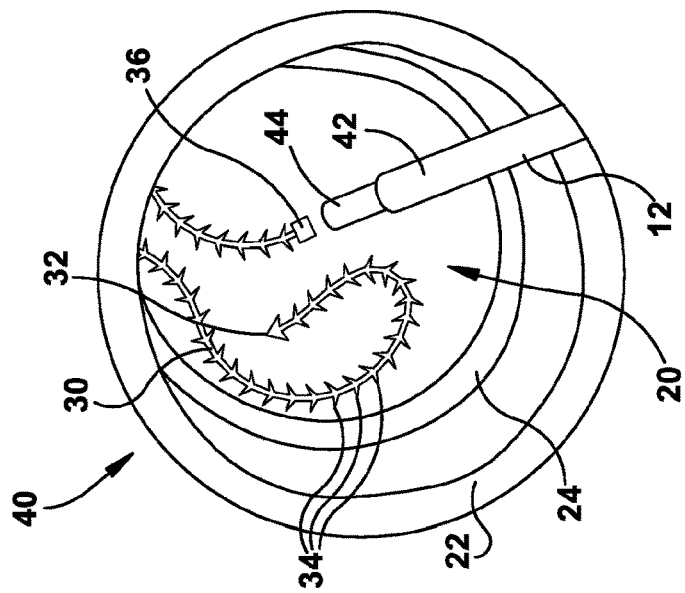

Referring to FIG. 1A, at the initial step 40 of the urethra to bladder anastomosis method, an innermost tube 14 of a concentric tube manipulator 12 fitted with a suture delivery device or tool 42 is introduced to the surgical site 20 through endoscope. The tool 42 is configured to deliver of the suture 30 to the surgical site 20. For this purpose, the suture delivery tool 42 includes a tube 44 constructed of a biocompatible material with a notch at its tip. The suture 30 is loaded into the lumen of the tube 44 leading end first (i.e., the end opposite the anchor 36 first). With the suture 30 fully inserted into the tube 44, the anchor 36 is placed into the notch at the tip of the tube.

Once positioned at the surgical site 12, the suture 30 is removed from the tube 44. This can be done, for example, using a concentric tube manipulator 12 fitted with a manipulating end effector (not shown at step 40; see, e.g., the manipulator arm 52 of steps 50-80). The manipulator 50 can be used to grasp the suture 30 and the suture delivery tool 42 can be retrieved from the endoscope.

Referring to FIG. 1B, at step 50 of the urethra to bladder anastomosis method, a pair of concentric tube manipulators 12 are delivered to the surgical site 20 through the endoscope. These include a concentric tube manipulator 12 fit with a manipulating end effector or manipulator arm 52 attached to an innermost tube 14 of the manipulator, and a concentric tube manipulator 12 with a needle end effector or needle arm 54 formed on or from the innermost tube 14 of the manipulator. In the example implementation illustrated in FIGS. 1A-F, the manipulator arm 52 is a grasper including articulated jaws that are actuatable to open and close to grasp tissue, the suture 30 or the needle arm 54. The needle arm 54 has a sharp, pointed construction that is configured to pierce tissue easily.

The needle arm 54 includes a sharp, pointed tip 58, which can be achieved through a chamfered cutting of the distal tip of the innermost tube 14. This is illustrated, for example, in FIGS. 6, 7C, and 7D. The needle arm 54 is a hollow tubular structure that carries within its lumen a suture grasping element which, in the example configuration of FIGS. 1A-F, comprises an actuatable lasso 56. The lasso 56 (see, FIGS. 1C-E) is actuatable to extend from the distal tip 62 of the needle arm 54 forming a loop positioned at the needle arm tip. The lasso 56 is actuatable to retract to close the loop and cinch down on any structure positioned within the loop. In this manner, the needle arm 54 can manipulate the suture 30 by grasping it with the lasso 56.

At step 50 (see FIG. 1B), a stitch is initiated, with the needle arm 54 piercing the proximal structure, i.e., the urethra 22, from interior to exterior, and piercing the distal structure, i.e., the bladder ostium 24, from exterior to interior, positioning the tip 62 inside the bladder ostium. As shown in FIG. 1C, at step 60, the lasso 56 is extended from the tip 62 of the needle arm 54 and the leading end 32 is passed therethrough, for example, by using the manipulator 52 to grasp and manipulate the suture 30. The lasso 62 is retracted into lumen of the needle arm 54 to cinch down on and grasp the leading end 32 of the suture 30.

Referring to FIG. 1D, at step 70, the needle arm 54 is retracted back through the bladder ostium 24 and the urethra, pulling the suture 30 through the openings or incisions pierced by the needle arm 54 in step 50 (FIG. 1B). As the suture 30 is retracted, the barbs 34 pass through the pierced openings easily, but resist being pulled back through the pierced openings, due to their barbed construction. This allows the surgeon to complete the suturing procedure incrementally with the barbs 34 holding the suture 30 in place wherever the surgeon desires. In this manner, the surgeon can elect to partially tighten the suture 30 at each stitch location, and then fully tighten the suture once all stitches are completed.

At this point, it is important to note that the concentric tube manipulator 12 configuration of the needle arm 54 is important to the suturing/stitching functionality of the system, method, and apparatus disclosed herein. The concentric tube manipulator functionality of the needle arm 54 allows the needle arm to follow a predetermined curved path when piercing through the urethra 22 and bladder ostium 24, and then follow that same path when retracted back through those anatomical structures and pulling the suture 30 along with it. This allows the suturing method to be performed from inside the urethra 22 and bladder ostium 24, by producing a consistent, repeatable stitching path of the needle arm 54 from inside the urethra to the outside, across the interface of the urethra and the bladder ostium, and through the bladder ostium and back into the surgical site 20. Repeating this motion with consistency and along the same curved path allows the suturing to take place without tearing or other tissue damage that could result if the stitching path was inconsistent.

Additionally and importantly, this reliable and repeatable curved path allows the needle arm to pierce the urethra 22 and bladder ostium 24 in/from a direction that is closer to radial with respect to the diameters of these lumens. As a result, when the suture 30 is tightened, the sutured structures will be pulled together in an axial direction. Advantageously, relative twisting between the anatomical structures can be avoided due to the radial piercing achieved with the curved concentric tube configuration of the needle arm 54.

To help facilitate this operation, the curvature of the concentric tube manipulator 12 and the needle arm 54 are configured with a predetermined pre-curvature. Additionally, the endoscope tube from which the concentric tube manipulators 12 are deployed can also be curved or angled, e.g., via guiding channels, in order to control the initial trajectory of the manipulators. The manipulator pre-curvatures and guiding channels can be selected to support the particular surgical operation or method in which the system and apparatus are implemented. In the example implementation of FIGS. 1A-F, the configurations of the endoscope guide channels, the concentric tube manipulators 12, and the needle arm 54 can be configured specifically for the illustrated urethra to bladder anastomosis method, taking into account the respective diameters of the urethra 22 and bladder ostium 24 in order to produce a stitching path that places the suture 30 at a desired location relative to those structures. Additionally, the length of the needle arm 54 can be chosen to overcome the gap between the proximal and distal tissue structures. In the example implementation of FIGS. 1A-F, the gap is that between the urethra 22 and the bladder ostium 24.

When the needle arm 54 is retracted in step 70 of FIG. 1D, the leading end 32 of the suture 30 is positioned back within the lumen at the surgical site 20. As shown at step 80 of FIG. 1E, the lasso 56 can be extended/opened manipulator arm 52 can be used to grasp the suture 30 to remove it therefrom. The needle arm 54 can then be actuated to pierce the urethra 22 and bladder ostium 24 at the next stitch location in the same manner described above in regard to step 50 of FIG. 1B. The manipulator arm 52 can be used to facilitate grasping the lead end 32 of the suture 30 with the lasso 56 so the stitch can be completed at this next stitch location, in the same manner as described in reference to FIGS. 1C-E. To facilitate this piercing at the next location, the entire apparatus, e.g., the endoscope can be rotated or indexed a predetermined angle to position the stitch at the next radial location, in order to take advantage of the combined functionality of the pre-curved manipulators and their respective guide channels.

The steps 50, 60, 70, 80 of FIGS. 1B-E are repeated, as necessary to complete the suturing operation. As shown in FIG. 1F, in the example implementation, these steps are performed a total of seven times, producing seven stitches 92. Once all the stitches are completed, the surgeon can use the manipulator arm 52 and needle arm 54 to tighten down the suture at all of the stitch locations and to trim any excess suture 30 material from the end thereof. As shown at step 90 of FIG. 1F, the method results in the illustrated completed urethra to bladder anastomosis.

Suturing Variations

The suture 30 and suturing technique illustrated in FIGS. 1A-F is an example of one type of suture that can be utilized in the system, apparatus, and method disclosed herein. The type of suture that is utilized is not important, nor is the suturing technique that is implemented, and either or both can be varied from those disclosed in FIGS. 1A-F.

According to one variation, instead of a single suture that forms all of the stitches, an interrupted suture technique, with one independent suture per stitch, can be implemented. This would, of course, require that individual sutures would need to be delivered to the surgical site, as shown in FIG. 1A. Each of these individual sutures could be applied using the same technique illustrated in FIGS. 1B-F.

According to another variation, an interrupted suture technique with two or more stitches per independent suture, can be implemented. Depending on the number of the sutures, the first stitch location of each independent suture is distributed equally along the cross section of the lumen. For each suture the first stitch is performed before the second stitch for any suture is performed. For the second and further stitches, after the release of the suture inside the proximal tissue structure, it is transported to the next stitch location inside the distal tissue structure by the suture/tissue manipulation arm. The stitch locations can be located clockwise or counterclockwise relative to the previous stitch of the same suture.

According to another variation, instead of a barbed suture, a running suture with suture thread (e.g., Nylon, Polypropylene, Polyester, silk) can be used for the entire suturing procedure. In this variation, the suture is stitched along the entire periphery of the adjoining tissue in a continuous manner, with a single knot tying off the suture.

For any of the aforementioned suturing techniques, in order to properly draw together the lumens of the urethra and bladder ostium, it can be preferable to tighten each suture stitch after all stitches have been performed. This helps draw together the lumens with proper alignment. By "full tightening," it is meant that the two lumen ends engage each other. The sutures can be tightened fully after each stitch or partially after each stitch, bringing the two lumen ends closed to each other, but not yet touch each other.

Concentric Tube Manipulators

The concentric tube manipulators 12 are small, needle-diameter, tentacle-like robots that include multiple concentric, straight or pre-curved, elastic tubes. The curvature of the tubes can be consistent or varied along their lengths, either in-plane or out-of-plane. The concentric tubes are typically made of a super-elastic metal alloy such as a nickel-titanium alloy ("nitinol") material. The tubes can, individually or in combination, be rotated about the longitudinal axis of the manipulator and can be translated along the longitudinal axis of the manipulator. Through rotational movement, the concentric tubes can be rotated relative to each other. Through translational movement, the tubes can be retracted into one another and extended from one another in a telescoping manner.

As the pre-curved tubes interact with one another through relative translational and rotational movement, they cause one another to bend and twist, with the tubes collectively assuming a minimum energy conformation. The pre-curvature(s) of the tube(s) for a given concentric tube manipulator 12 can be selected to provide a desired workspace throughout which the tip can access, or to follow a desired path so as to allow for the performance for a particular function or to navigate a particular anatomical structure. The curved shape of the distal end of the manipulator 12 is controlled via translation and rotation of each tube at a proximal location (e.g., at its base) outside the patient where the tubes are connected to the transmission. Through the combined movements of the tubes, the distal tips of the manipulators 12 can be made to perform desired movements within the workspace.

The needle arm consists similarly to the manipulator arm of one or more pre-curved tubes made of nitinol or other materials with super elastic quality (FIG. 8a). It can expose circular or a non-circular cross section. The cross section can for example be elliptic or rectangular to prevent the spontaneous sudden rotations of the tubes due to elastic deformation energy. The non-circular cross section avoids the independent relative rotations of the tubes to each other, such that they can only be translated independently. The curvatures of the tubes can exhibit different shapes similar to the manipulator arm. The translation of the needle tubes enables establishing different overall curvatures in order to overcome various distances between the separated lumen ends. The inner lumen inside the inner most tube can be used to introduce a snare structure, such as a lasso or grasper, for grasping the suture, or an actuation member for actuating an end effector on the tube's tip.

The tubes of the needle arm can possess marks (FIG. 8b) on the outer surface along its length to provide visual feedback about the deployed length of the tube and therefore the location of the piercing point in the distal tissue structure. In the case of two or more tubes the outer tubes would have a cutout along their whole length to be able to see the deployed length of the inner most tube through the cut out. The lines can be etched, laser cut or similar.

To overcome the distance inside along the endoscope, the tubes can consist of a pre-curved super-elastic end section and a straight steel section. Steel would counter the torsional twisting more than the super-elastic material.

Surgical System

Figure 2:
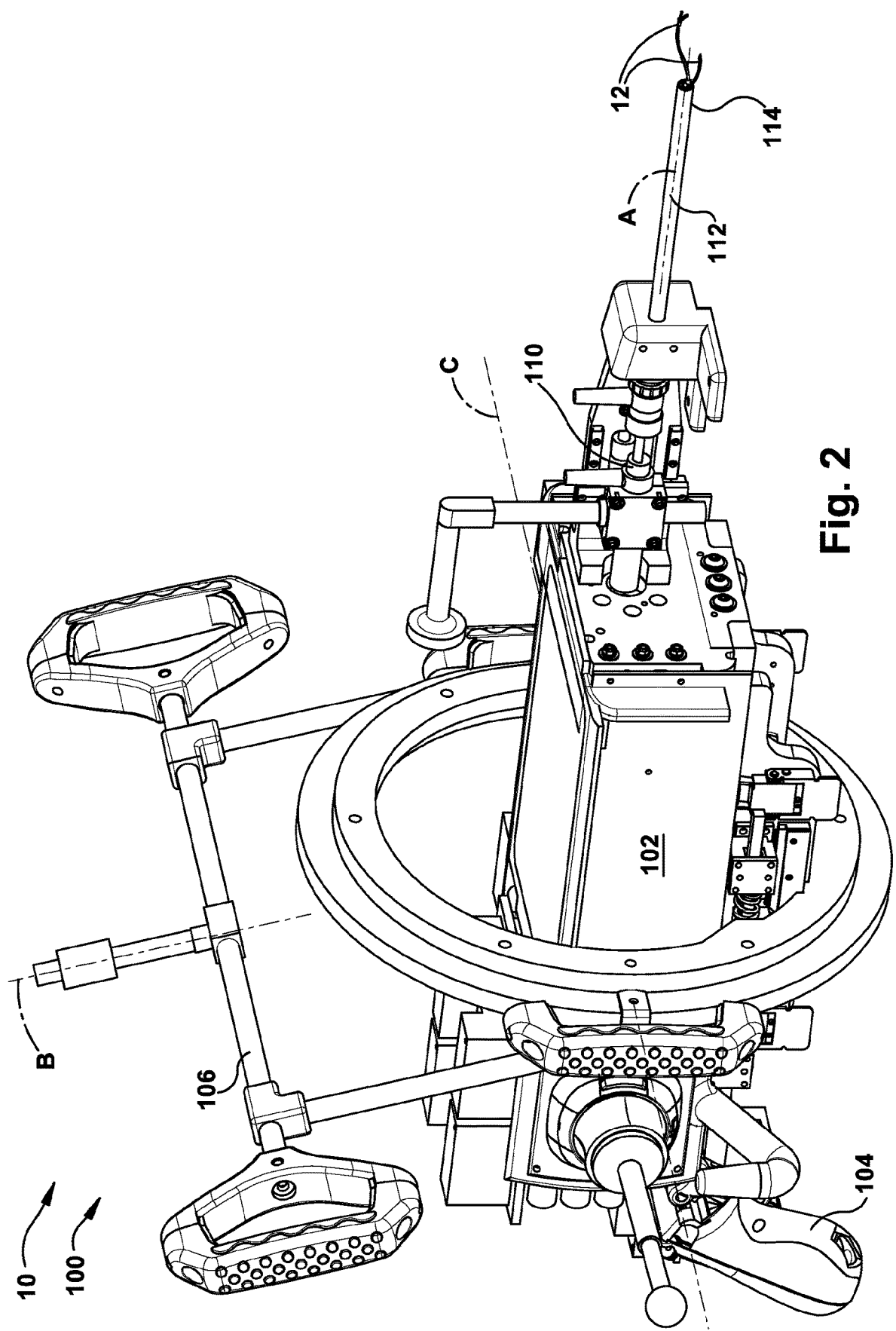
FIG. 2 illustrates an example configuration of a robotic assembly in which the apparatus can be implemented.

The surgical system 10 is illustrated in greater detail in FIG. 2. Referring to FIG. 2, the concentric tube manipulators 12 are delivered via an apparatus in the form of a robotic assembly 100 supported on a support structure 106. The robotic assembly 100 can, for example, be similar or identical in form and/or function to the robotic assembly disclosed in U.S. Pat. No. 10,238,457 B2, which was issued on Mar. 26, 2019 to Herrell et al. The disclosure of U.S. Pat. No. 10,238,457 B2 is hereby incorporated by reference in its entirety.

The robotic assembly 100 includes the concentric tube manipulators 12, a transmission for imparting translational and rotational movements to the concentric tube manipulators, and a motor pack including electric motors for supplying power for operating the transmission. The transmission and motor pack are not illustrated in great detail and are identified generally at 102 in FIG. 2.

The robotic assembly 100 can be controlled locally via control handles 104 mounted to the rear of the assembly. Alternatively, the robotic assembly 100 can be controlled remotely from a surgeon's console. For the former implementation, the robotic assembly 100 can include a display screen on the rear of the assembly (not shown), between the control handles 104, that allows the surgeon to view the workspace while controlling the operation of the manipulator arm 52 and needle arm 54.

The motor pack 102 of the robotic assembly 100 includes one or more controllers (not shown), such as microcomputers, that receive high level control signals from the control handles 104. The high level control signals are indicative of desired tip movements of the concentric tube manipulators 12 inputted by the surgeon via the control handles 104. The controllers translate the high level control inputs and provide commands to low level motor controllers in the motor pack in order to operate the motors to produce tube movements (rotation and/or translation) via the transmission that will result in the desired tip motions.

The robotic assembly 100 also includes an endoscope 110, including an endoscope tube 112 through which the concentric tube manipulators 12 are deployed. The endoscope 110 can be a commercially available endoscope or it can have a custom configuration built specifically for robotic assembly 100 and/or for the particular implementation of the system 10. For the example urethra to bladder anastomosis implementation illustrated in FIGS. 1A-F, the endoscope tube 112 can be a 26 Fr (8.6 mm) endoscope tube for facilitating insertion through the urethra.

The support structure 106 supports the robotic assembly 100 for gross movement. By "gross movement," it is meant that the support structure supports the robotic assembly 100 for movement as a whole. The support structure 106 can, for example, support the robotic assembly 100 for translational and/or rotational movement about the axes identified at A, B, and C in FIG. 2. To facilitate ease in this movement, the support structure 106 can be outfitted with counter weighting, balancing, pre-loading, etc. so that the robotic assembly 100 can be moved easily by the surgeon. For the example urethra to bladder anastomosis implementation illustrated in FIGS. 1A-F, this gross movement can allow the surgeon to insert the endoscope tube 112 into the urethra to place its distal end 114 at the surgical site.

The support structure 106 can also include a locking mechanism for locking the position of the robotic assembly 100 relative to the patient once the endoscope tube 112 is inserted in the urethra with its distal end 114 positioned at the surgical site. Once locked in this position, the concentric tube manipulators 12 can be operated robotically via the control handles 104 to perform the fine movements and operations with the concentric tube manipulators 12 and the affixed tools to perform the surgical procedure.

Endoscope Design

Referring to FIGS. 3A-B, the endoscope 110 can be a conventional, commercially available endoscope that can be purchased "off-the-shelf," so to speak. The endoscope 110 can, for example, be a conventional 26 Fr (approx. 8.6 mm) endoscope with optics and illumination included. In this configuration, the endoscope 110 includes a camera 120 and light source 122 disposed at the distal end 114 of the endoscope tube 112. The concentric tube manipulators 12 are deployed through an inner lumen 124 of the endoscope tube 112. For this purpose, the endoscope 110 can be fitted with guide tubes that create channels through which the concentric tube manipulators 12 can be deployed.

The example endoscope 110 configuration illustrated in FIGS. 3A-B includes three guide tubes for guiding the concentric tube manipulators 12 through the endoscope tube 112. A straight guide tube 130 is located centrally in the endoscope tube 112, and two curved guide tubes 132 located below the straight guide tube. The straight guide tube 130 is aimed axially from the distal end 114 of the endoscope tube. The curved guide tubes 132 follow a curved path, exiting the distal end 114 in an outward direction aimed away from each other and from the centrally located straight guide tube 130.

The guide tubes 130, 132 illustrated in FIGS. 3A-B have a circular cross-section. The guide tubes could, however, have alternative non-circular cross-sections, such as elliptical or rectangular. Such non-circular cross sections could help avoid instabilities between the multiple tubes forming the concentric tube manipulators 12, and between the manipulators and the guiding channels themselves. This could be beneficial in offering a degree of safety, given that these instabilities can result in unwanted tube movements.

The guide tubes 130, 132 can be placed inside the inner lumen 124 of the endoscope 110 sliding them in longitudinally. The guide tubes 130, 132 can be replaced easily and do not influence the functionality of the endoscope 110. The guide tubes 130, 132 are secured via an adapter 134, constructed of metal or plastic, that is fixed in the endoscope lumen 124 at the distal end 114 of the endoscope tube 112. The adapter 134 can be secured to the endoscope tube 112 in any suitable manner, such as an interference fit, gluing, or other means. An adapter (not shown) similar to the adapter 134 can be installed at the proximal end of the endoscope 110 at or near the interface with the robotic assembly 100. This adapter can support the guide tubes 130, 132 at the proximal end and can facilitate installation and removal of the guide tubes, as well as secure the tubes in the installed condition, e.g., via latching mechanism.

The adaptor 134 is configured to fill the open space in the tube 112 left by the camera 120 and light sources 122. The adaptor 124 includes openings through which the guide tubes 130, 132 extend, and supports the tubes at the distal end 114 where they exit the endoscope 110. As can be seen in FIG. 3B, the adaptor 134 can be configured to occupy a small portion of the length of the endoscope tube 112 at the distal end 114. The adaptor at the proximal end of the endoscope 110 can be similarly configured.

As shown in FIG. 3A, the adaptor 124 can permit the guide tubes 130, 132 to extend or protrude somewhat from the distal end 114 of the endoscope tube 112. This can be advantageous because their protrusion from the distal end 114 allows the channels and their respective concentric tube manipulators 12, to clear the sidewall of the endoscope tube 112 when exiting the endoscope 110. This is especially true with the curved guide tubes 132 because the concentric tube manipulators 12 exiting from these guide tubes can benefit from this clearance when exiting at an angle from the endoscope 110.

The endoscope 110 is, of course, not limited to a conventional, purchased off-the-shelf design. The endoscope 110 can also be of a custom design, configured specifically to perform the functions described herein. Implementing a custom endoscope 110 can be advantageous, for example, in that the adapter 134 and guide tubes 130, 132 can be integral to the design, as opposed to being retrofitted into a commercial endoscope. A custom endoscope 110 configuration can also be advantageous in terms of interfacing the scope with the robotic assembly 100 and facilitating some of the system functionality associated therewith. Some of these modifications/customizations are discussed herein below (see, e.g., FIG. 10).

Adaptor/Guide Tube Variations

The configurations of the adaptor 134 and guide tubes 130, 132 can be selected to facilitate the particular surgical procedure being performed via the surgical system 10. For example, the configuration illustrated in FIGS. 3A-B can be particularly advantageous in performing the urethra to bladder anastomosis procedure illustrated in FIGS. 1A-F. Noting that the anastomosis procedure illustrated in those figures requires two concentric tube manipulators 12, i.e., the manipulator arm 52 and the needle arm 54, the presence of the third guide tube, particularly the presence of two curved guide tubes 132, is advantageous, especially to the execution of an anastomosis procedure such as that illustrated in FIGS. 1A-F.

Those skilled in the art will appreciate that performing the stitches 92 about the periphery of the adjoined structures 22, 24 (see FIG. 1F) utilizing the curved needle arm 54 approach discussed above requires a specific and/or preferred angle of attack at the location of each stitch. Because the manipulator arm 52 does not require a specific curved approach, but preferably enjoys dexterity in all directions, it can be deployed through the straight guide tube 130 and can thereby easily access the entire workspace at the surgical location 20.

The needle arm 54, however, benefits from and may even require deployment through the curved guide tube 132 in order to achieve the curved path necessary to perform the suturing function. As discussed above, the outside-in/inside-out approach for piercing the tissue with the needle arm 54 requires a precise curved path. Because the required curved path is different at the location of each stitch 92, the desired direction at which the curved guide tube 132 directs the needle arm 54 from the endoscope 110 is different for each stitch. To achieve the proper directional alignment of the curved guide tube for each stitch location, the support structure 106 can be adjusted to rotate the entire robotic assembly 100 about the axis A (see FIG. 2) in order to adjust the direction of the curved guide tube 132.

Following this approach, however, the robotic assembly 100 will eventually be oriented upside down in order to achieve the required orientation of the curbed guide tube(s) 132. This is disadvantageous because this would place the control handles 104 and the display screen upside down as well, making it difficult or impossible for the surgeon to perform the operation. One solution would be to allow the control handles to pivot or rotate 180-degrees for upside down operation. In this instance, the display screen could flip the image to right side up from the surgeon's perspective.

Simplifying this situation, however, is the inclusion of the second curved guide tube 132, which points in the opposite direction. Because of this, one of the curved guide tubes 132 can be used to deliver the needle arm 54 and apply sutures on one side, e.g., to the left of the surgical site 20 as viewed in FIGS. 1A-F. The other of the curved guide tubes can be used to deliver the needle arm 54 and apply sutures on the other side, e.g., to the right of the surgical site 20 as viewed in FIGS. 1A-F. The example configuration of the endoscope 110 illustrated in FIGS. 3A-B, specifically the curved guide tubes 132 and adapter 134, is particularly well-suited to perform the urethra to bladder anastomosis surgical procedure.

The configurations of the guide tubes 130, 132 and the adaptor 134 are not limited to those illustrated in FIGS. 3A-B. Variations of the adaptor 134 and/or guide tubes 130, 132 can be implemented in the surgical system 10, depending on factors such as the surgical procedure being performed and the preferences of the surgeon.

Generally speaking, the system 10 implements two or more guiding channels 130, 132 in the endoscope 110. This is because, for suturing procedures, at least two channels are required—one for the needle arm 54 and one for the manipulator arm 52. Examples of these variations are illustrated in FIGS. 4A-C. As with the configuration of FIGS. 3A-B, the channels extend beyond the distal end 114 of the endoscope 110 to provide the operator with the visual feedback regarding the location of the channels and, also, the locations where the needle and manipulating arms will exit the endoscope.

Referring to FIG. 4A, a first variation of the endoscope 110 includes an adaptor 134 configured to support two straight guide tubes 130. The straight tubes 130 in this configuration can be sized, positioned, and arranged symmetrically in the endoscope 110.

Referring to FIG. 4B, a second variation of the endoscope 110 includes an adaptor 134 configured to support one straight guide tube 130 and one curved guide tube 132.

Referring to FIG. 4C, a second variation of the endoscope 110 includes an adaptor 134 configured to support two curved guide tubes 132.

Referring to FIG. 5, the guide tubes 130, 132 can be flexible and configured to extend along a helical path within the inner lumen 124 of the endoscope tube 112. This arrangement can be beneficial in that the adapter 134, or a portion thereof supporting the guide tubes 130, 132, can be configured to rotate so that the guide tubes can switch sides at the tip of the endoscope 110. Configuring the guide tubes 130, 132 in this helical configuration provides the excess guide tube length within the endoscope 110 necessary to support rotation via the adaptor 134 while maintaining the ends of the guide tubes positioned at the tip of the endoscope.

Referring to FIG. 6, according to one example implementation, the endoscope 110 is outfitted with guide tubes 130, 132 that are fused together or otherwise joined at least along a distal section of the tubes, proximal to the adapter 134 at the distal end 114 of the endoscope tube 112. In this fused/joined configuration, the tubes 130, 132 share a center wall 160. At a point proximal of the distal end 114 and adapter 143, there is a break in the center wall 160 defining an opening 162 that allows for communication between the guide tubes 130, 132. This allows the concentric tube manipulator 12, particularly the needle arm 54, to be swapped between the guide tubes 130, 132.

The swapping of guide tubes 130, 132 with the needle arm 54 relies on the curved nature of the tubes that make up the manipulator 12. To achieve this swapping, the manipulator 12 is actuated axially and rotationally to back the manipulator out of the adapter 134 so that its tip is positioned proximally of the opening 162. The manipulator 12 is then rotated so that its curve is directed toward the center wall 160 and opening 162. The manipulator is then advanced axially toward the distal end 114 of the endoscope tube 112. When the tip of the manipulator 12 reaches the opening 162 it will deflect into the opposite tube 130, 132 due to its tendency to conform to its pre-curved configuration. To promote this transfer between the tubes, the guide tubes can be configured to have a non-circular configuration in the area of the center wall 160 and opening 162, so that the manipulators 12 can slide along a flat surface just prior to transferring through the opening.

Although FIG. 6 shows a guiding channel of equal diameter along its whole length, it could be configured so that a portion proximal to the opening 162 has a diameter that is reduced, in order to free-up space in the endoscope 110. In this instance, the guide tubes 130, 132 can be fitted with a joint or fitting that acts as a reducer for combining the guide tubes and reducing the diameter proximally of the adapter 134. In one particular configuration, the adapter 134 can be configured to include the reducer, center wall 160, and opening 162 and can be configured to receive the single, small diameter channel that leads to the split, at the adapter 134, to the two separate guide tubes 130, 132.

In this manner, two manipulators 12, such as a manipulating arm 52 and a needle arm 54, can be swapped between guide tubes 130, 132. Advantageously, since the concentric tube manipulators 12 are operated robotically via the robotic assembly 100, this swapping can be automated. The swapping can be initiated through a single command.

Although the concentric tube manipulator 12 illustrated in FIG. 6 is a needle arm 54, the implementation of the swapping feature is equally well-suited for use with the manipulator arm 52. In fact, the swapping features of FIG. 6 can be particularly advantageous in an endoscope configuration including only two guide tubes 130, 132, because this allows for the manipulator arm 52 and needle arm 54 to be swapped. Of course, the swapping feature could be implemented in a configuration that includes more than two guide tubes.

End Effectors

The concentric tube manipulator 12 can be equipped with a variety of end effectors that enable grasping, manipulating, cutting, and other operations. For this purpose, the lumen of the innermost tube 14 of the manipulator 12 facilitates the passing through of an actuating member, such as a cable, wire, or rod, configured to actuate the end effector through pushing, pulling, rotation, etc. The actuating member can be actuatable robotically via the robotic assembly 100. Examples of different end effectors that can be implemented in the system 10 at the end(s) of the concentric tube manipulator(s) 12 and actuated robotically via the robotic assembly 100 are illustrated in FIGS. 7A-7L and 8A-8C.

As shown in FIG. 7A, the end effector can be forceps 170 with one fixed jaw 172 and one actuatable jaw 174 pivotable about an axis, as illustrated generally by the curved arrow in FIG. 7A. The actuatable jaw 174 can be actuated via an actuating member (cable, wire, rod, etc.) extending through the innermost tube 14 of the concentric tube manipulator 12 (in this instance, a manipulating arm 52).

As shown in FIG. 7B, the end effector can be forceps 180 with two actuatable jaws 184 pivotable about an axis, as illustrated generally by the curved arrows in FIG. 7B. The actuatable jaws 184 can be actuated via an actuating member (cable, wire, rod, etc.) extending through the innermost tube 14 of the concentric tube manipulator 12 (again, in this instance, a manipulating arm 52).

As shown in FIG. 7C, the end effector is the lasso 56 described above with reference to the method illustrated in FIGS. 1A-F. The lasso 56 is actuatable to extend from and retract into the inner lumen of the concentric tube manipulator 12 which, in this case, is a needle arm 54. The extension and retraction of the lasso 56 out of and into the pointed tip 58 of the needle arm 54 is illustrated generally by the arrow in FIG. 7C. The lasso 56 can be actuated via an actuating member (cable, wire, rod, etc.) extending through the innermost tube 14 of the concentric tube manipulator 12. It will therefore be appreciated that the needle arm 54 of FIG. 7C can be used both for stitching tissue and for manipulating tissue, sutures, or other objects.

As shown in FIG. 7D, the end effector can be aligned openings 190 through the sidewall of the innermost tube 14 of the concentric tube manipulator 12, which forms the needle arm 54. As shown, the openings 190 can be located proximally from the needle tip 58 of the innermost tube 14. The extension and retraction of the innermost tube 14 is illustrated generally by the arrow in FIG. 7D. The openings 190 allow for the needle arm 54 to be used in the manner of a lasso to grasp items by retracting the innermost tube 14 while the item is positioned within one or both of the openings. It will therefore be appreciated that the needle arm 54 of FIG. 7D can be used both for stitching tissue and for manipulating tissue, sutures, or other objects.

As shown in FIG. 7E, the end effector can be a chamfered block 200 that is fixed at the distal end of the innermost tube 14 of the concentric tube manipulator 12. The block 200 is seated in and occupies a notch 202 in the innermost tube 14 and helps form the needle tip 58 of the needle arm 54. As shown, the block 200 is extendable and retractable from the notch 202, via an actuating member 204, such as a cable, wire, rod, etc. The extension and retraction of the innermost tube 14 is illustrated generally by the arrow in FIG. 7E.

In the retracted position, shown in solid lines, the block 200 closes the notch 202 and helps define the needle tip 58, with its chamfered surface being co-planar with the chamfer of the innermost tube 14 at the tip. In the extended position, shown in dashed lines, the block 200 extends forward and opens the notch 202. In this example implementation, the block 200 and the notch 202 allow for the needle arm 54 to be used in the manner of a grasper. To do so, the needle arm 54 is maneuvered, while the block 200 is extended, so that an object or tissue to be grasped is positioned in the notch 202. The block 200 is then retracted to clamp down on and retain the object/tissue in the notch 202. It will therefore be appreciated that the needle arm 54 of FIG. 7E can be used both for stitching tissue and for manipulating tissue, sutures, or other objects.

The example implementation of FIG. 7F combines elements of previous example implementations. As shown in FIG. 7F, the concentric tube manipulator 12 is a needle arm 54 in which the needle tip 58 is formed by grasping jaws 210. In the example implementation of FIG. 7F, the upper jaw 212 is fixed and the lower jaw 214 is pivotable about an axis, as indicated generally by the curved arrows in the figure. The actuation can be effectuated via an actuating member, such as a cable, wire, rod, etc. The jaws 210 can be actuated to grasp and manipulate tissue or objects. Maintaining the jaws 210 in the closed condition allows the concentric tube manipulator 12 to be used to pierce and stitch tissue. It will therefore be appreciated that the concentric tube manipulator 12 of FIG. 7F can be used both for stitching tissue and for manipulating tissue, sutures, or other objects.

The example implementation of FIG. 7G is similar to the implementation of FIG. 7F. As shown in FIG. 7G, the concentric tube manipulator 12 is a needle arm 54 in which the needle tip 58 is formed by grasping jaws 220. The upper jaw 222 is fixed and the lower jaw 224 is pivotable about an axis, as indicated generally by the curved arrows in the figure. The difference between the configuration of FIG. 7G and the configuration of FIG. 7F is that the fixed jaw 222 of FIG. 7G is formed as a part of the innermost tube 14 itself. The actuation of the lower jaw 224 can be effectuated via an actuating member 226, such as a cable, wire, rod, etc. The jaws 220 can be actuated to grasp and manipulate tissue or objects. Maintaining the jaws 220 in the closed condition allows the concentric tube manipulator 12 to be used to pierce and stitch tissue. It will therefore be appreciated that the concentric tube manipulator 12 of FIG. 7G can be used both for stitching tissue and for manipulating tissue, sutures, or other objects.

As shown in FIG. 7H, the end effector can be tweezer-like graspers 230 in combination with an end cap 232 fitted onto the end of the innermost tube 14 of the concentric tube manipulator 12 which, in this instance is a manipulator arm 52. The graspers 230 can be constructed from a single sheet of material, e.g., a super-elastic metal (nitinol) or other resilient metal or plastic material, that is cut to form two upper grasping arms 234 and a single lower grasping arm 236. Since the graspers can be cut from a single sheet of material, the upper grasping arms 234 can be spaced apart from each other, and the lower grasping arm 236 can be formed from the material between the upper grasping arms. The upper and lower grasping arms 234, 236 can be further bent, machined, etc. to produce the generally C-shaped profile shown in FIG. 7H.

As shown in the exploded portion of FIG. 7H, the end cap 232 can be fitted onto the innermost tube 14 of the concentric tube manipulator 12. The end cap can include a V-shaped notch 240 that corresponds to a V-shaped notch 242 in the distal end of the innermost tube 14. When assembled, the notches 240, 242 align with each other.

The graspers 230 also include an actuator arm 244 that extends axially away from the grasper arms 234, 236 and is positioned in the tube 14 when assembled. An actuating member 246 (cable, wire, rod, etc.) extending through the innermost tube 14 of the concentric tube manipulator 12 is connected to the actuator arm 244. The graspers 230 are actuated closed by tensioning or pulling on the actuating member 246 into the tube 14, which causes the grasping arms 234, 236 to be drawn in to the notches 240, 242. The grasping arms 234, 236 engage the notches 240, 242 and are urged toward each other as the grasper 230 is pulled further into the notches, which closes the grasper. Drawing the grasper 230 fully into the notches 240, 242 brings the grasper arms 234, 236 completely together, fully closing the grasper.

To open the grasper 230, the actuating member 246 is released or used to push the grasper arms 234, 236 out of the notches 240, 242. As the grasper arms 234, 236 leave the notches 240, 242, the grasper 230 opens due to the resilient nature of the material used in its construction.

The end effector of FIG. 7I is similar in operation to the end effector of FIG. 7H. In FIG. 7I, the concentric tube manipulator 12 is a manipulator arm 52. The end effector is in the form of tweezer-like graspers 250 including opposed grasping arms 252 having a C-shaped configuration and presented facing concavely toward each other. The grasping arms 252 can be constructed of a material such as a super-elastic metal (nitinol) or other resilient metal or plastic material, that is cut to form the arms. The upper and lower grasping arms 252 can be further bent, machined, etc. to produce the generally C-shaped profile shown in FIG. 7I. The grasping arms can be secured to each other, e.g., by spot weld, an adhesive, fasteners, etc. to form the tweezer-like configuration illustrated in the figure.

An actuating member (cable, wire, rod, etc.) extending through the innermost tube 14 of the concentric tube manipulator 12 is connected to the graspers 250. The graspers 250 are actuated closed by tensioning or pulling grasping arms 252 into the tube 14. The grasping arms 252 engage the terminal end of the tube 14, which urges the arms closer together toward each other. As the grasper 250 is pulled further into the tube, it closes further. Drawing the grasper 250 fully into the tube 14 brings the grasper arms 252 completely together, fully closing the grasper.

To open the grasper 250, the actuating member is released or used to push the grasper arms 252 out of the tube 14. As the grasper arms 252 leave the tube 14, the grasper 250 opens due to the resilient nature of the material used in its construction.

The end effector of FIG. 7J is identical in form and operation to the end effector of FIG. 7I. The only difference between the two is that the concentric tube manipulator 12 is a needle arm 54. The end effector is tweezer-like graspers 260 including opposed grasping arms 262 having a C-shaped configuration and presented facing concavely toward each other. The graspers 260 are actuated closed by tensioning or pulling grasping arms 262 into the needle tip 58 of the needle tube 14. Because of this, it can be important to orient the graspers 250 rotationally so that the grasping arms engage the needle tip 58 of the tube at the same time. Although the configuration of FIG. 7J illustrates a two-prong grasper configuration with opposed prongs spaced 180 degrees apart, a three prong configuration, such as one in which the prongs are spaced 120 degrees apart, can also be implemented.

The actuating member draws the grasping arms 262 into engagement with the end of the needle tube 14, which urges the arms closer together toward each other. As the grasper 260 is pulled further into the tube, it closes further. Drawing the grasper 260 fully into the tube 14 brings the grasper arms 262 completely together, fully closing the grasper. To open the grasper 260, the actuating member is released or used to push the grasper arms 262 out of the tube 14. As the grasper arms 262 leave the tube 14, the grasper 260 opens due to the resilient nature of the material used in its construction.

Figure 7K:
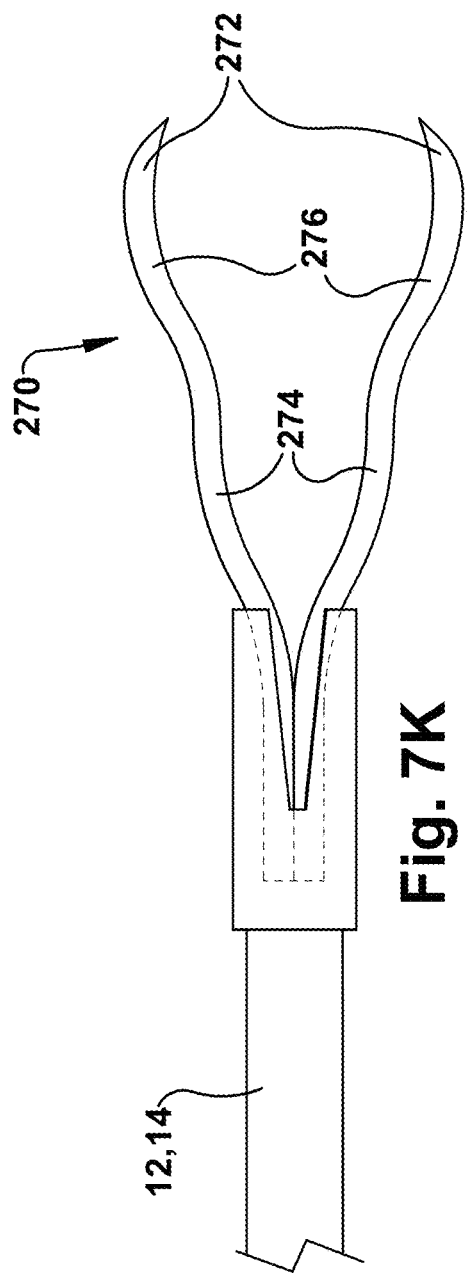

The end effector of FIG. 7K is identical to the end effector of FIG. 7H, except that the tweezer-like graspers 270 of FIG. 7K are of a two-stage design. As shown in FIG. 7K, the grasping arms 272 include a first stage 274 and a second stage 276. The first stage 274 compose a set of graspers that is smaller in length, curvature, and spacing, and is therefore suited to grasp smaller objects. The second stage 276 is larger in length, curvature, and spacing, and is therefore suited to grasp larger objects. The second stage 276 also includes the distal tips of the grasping arms 272 and can facilitate precise grasping at that location.

As shown in FIG. 7K, the end cap 278 can be fitted onto the innermost tube 14 of the concentric tube manipulator 12. The end cap 278 is identical to that illustrated in FIG. 7H and therefore includes the V-shaped notch that corresponds to a V-shaped notches in the distal end of the innermost tube 14. When assembled, the notches align with each other.

An actuating member (cable, wire, rod, etc.) extending through the innermost tube 14 of the concentric tube manipulator 12 is connected to the graspers 270. The graspers 270 are actuated closed by tensioning or pulling on the actuating member into the tube 14, which causes the grasping arms 272 to be drawn in to the notches of the end cap 278. The grasping arms 272 engage the notches and are urged toward each other as the grasper 270 is pulled further into the notches, which closes the grasper. Drawing the grasper 270 fully into the notches brings the grasper arms 272 completely together, fully closing the grasper. Pulled partway into the tube 14, the grasper 270 closes the first stage 272. Pulling the grasper 270 in further closes the second stage 274.

To open the grasper 270, the actuating member is released or used to push the grasper arms 272 out of the end cap 278. As the grasper arms 272 leave the notches, the grasper 270 opens due to the resilient nature of the material used in its construction.

Advantageously, the two-stage grasper 270 can be used to grasp two objects at the same time. For example, the grasper 270 can grasp a suture in the first stage 274 and tissue in the second stage 276. To facilitate this function, the object grasped by the first stage 274 (e.g., the suture) can be pulled into the aligned notches of the tube 14 and the end cap 278.

Figure 7L:
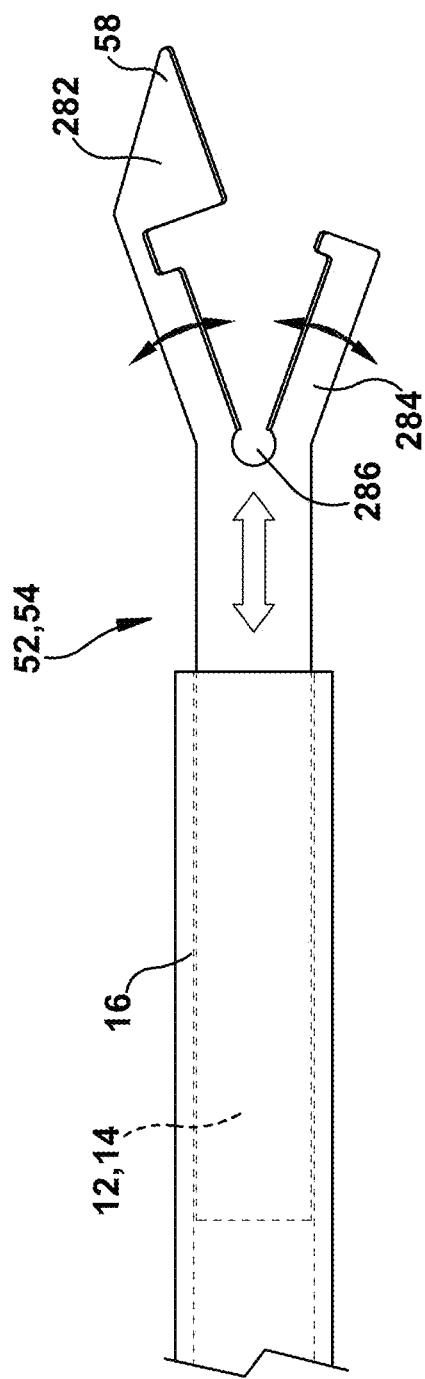

The end effector of FIG. 7L is formed entirely from the innermost tube 14 of the concentric tube manipulator 12. As such, the tube 14 is cut at the needle tip 58 to form a pair of grasping jaws 282, 284. An upper jaw 282 includes the needle tip 58. The sidewall of the tube 14 is also cut to form a round joint 286 that facilitates the tube 14 to flex or bend so that the jaws 282, 284 can pivot opened/closed, as indicated generally by the curved arrows in FIG. 7L. The jaws 282, 284 can be pre-bent or otherwise pre-formed to flex outward to the illustrated open condition under the resilience of the tube material.

The jaws 282, 284 can be actuated via an actuating member (cable, wire, rod, etc.) extending through the innermost tube 14 of the concentric tube manipulator 12. For the end effector of FIG. 7L, both jaws 282, 284 require actuation, so two actuating members can be provided. Alternatively, the actuating member can be bifurcated or split at the end so that it can be connected to each jaw 282, 284 individually. In either manner, tensioning the actuating member draws the jaws 282, 284 closed, and releasing tension on the actuating member allows the jaws to open due to their own resilience.

Alternatively, the jaws 282, 284 can be actuated by drawing or telescoping the innermost tube 14 into and out of the outer tube 16 of the concentric tube manipulator 12, as indicated generally by the linear arrow in FIG. 7L. As the inner tube 14 moves out of the outer tube 16, the jaws 282, 284 move to the open condition due to their pre-formed configuration. When the inner tube 14 is drawn into the outer tube 16, the jaws 282, 284 engage the outer tube wall, which causes the jaws to move to the closed condition.

In the closed condition, the inner tube 14 can act as a needle, or the jaws 282, 284 can grasp and object. In this manner, the concentric tube manipulator 12 of FIG. 7L can be both a manipulator arm 52 and a needle arm 54.

FIGS. 8A-C illustrate a configuration in which the end effector is formed form sidewall portions of the concentric tube manipulator 12. As shown in FIGS. 8A-C, this allows for the concentric tube manipulator 12 to be outfitted with both a needle tip and a grasper. The concentric tube manipulator 12 of FIGS. 8A-C thus functions both as a needle arm 54 and a manipulator arm 52.

The concentric tube manipulator 12 of FIGS. 8A-C includes an end effector in the form of a flap 300 that acts as a grasper for grasping objects, such as sutures, tissue, or other surgical tools/instruments. The flap 300 is generally rectangular in form, but this is not limiting, as other shapes could be implemented. The rectangular flap 300 is formed from overlying portions of concentric tubes—the innermost tube 14 and an outer tube 16. The overlying flap portions 302, 304, respectively of the inner and outer tubes 14, 16, are cut in a rectangular pattern on three sides. Free ends of the flap portions 302, 304 are joined together, e.g., by welding or adhesives, along a longitudinal edge 306 of the flap 300. other shapes side flaps The flap 300 is actuated through relative rotation of the inner and outer tubes 14, 16 from a closed condition (FIG. 8A) to an open condition (FIG. 8B). To actuate the flap 300 to the open condition, the inner tube 14, the outer tube 16, or both the inner and outer tubes are rotated about the manipulator axis so that the net effect is that the inner tube rotates clockwise as shown in FIG. 8C relative to the outer tube. As a result of this relative tube rotation, the flap 300 swings to the open condition of FIGS. 8B-C. To actuate the flap 300 to the closed condition, the inner tube 14, the outer tube 16, or both the inner and outer tubes are rotated so that the net effect is that the inner tube rotates counter-clockwise relative to the outer tube. In this manner, the flap can be placed in the open condition to receive an object, and can be placed in the closed condition to grasp the object.

Axial Extension/Depth Measurement

When using the concentric tube manipulators 12 in the manner disclosed herein, it can be important to gauge or measure the axial extension of the concentric tubes 14, 16 relative to each other so that the degree of extension or depth can be measured or monitored. This can, for example, allow the surgeon to gauge distances and aid in depth perception at the surgical site. To facilitate this, as shown in FIG. 9, the concentric tube manipulator 12 can be outfitted with indicia 310 on the inner tube 14 that can be indicative of length along the tuber (e.g., cm, mm, inches, etc.). The indicia 310 can, for example, provide an indication of length from the distal end 314 of the outer tube 16 the tip 58 of the inner tube 14.

To facilitate a lengthened measurement scale, the outer tube 16 can be outfitted with a slot 312 that facilitates viewing the indicia 310 positioned within the outer tube. The concentric tube manipulator 12 in FIG. 9 is a needle arm 54. The indicia 310 can, however, be implemented where the concentric tube manipulator 12 is a manipulator arm 52. The inclusion of the indica 310 in the needle arm 54 implementation of the concentric tube manipulator 12 can be especially advantageous when the needle arm pierces through the urethra and can exit the field-of-view of the camera in the lumen (see, FIG. 1B). The indicia 310 can allow the surgeon to gauge the position of the tip 58 of the needle arm 54 for piercing the bladder ostium back into the camera field-of-view (see also, FIG. 1B).

The suture 30 can include indicia similar to the indicia 310 on the tube 14 of the needle arm 54. The suture indicia can, for example, indicate a distance from the anchor 36 so that the surgeon can ascertain a location along the length of the suture relative to the anchor. For example, the indicia could include lines in patterns that become more dense as they are located in closer proximity to the anchor 36. This suture indicia can be used to gauge the proximity of the sutured structures relative to each other in order to ascertain when the suture is sufficiently tight. This can help prevent tissue damage, since no haptic feedback is provided by the end effectors.

Endoscope Customization

Figure 10:
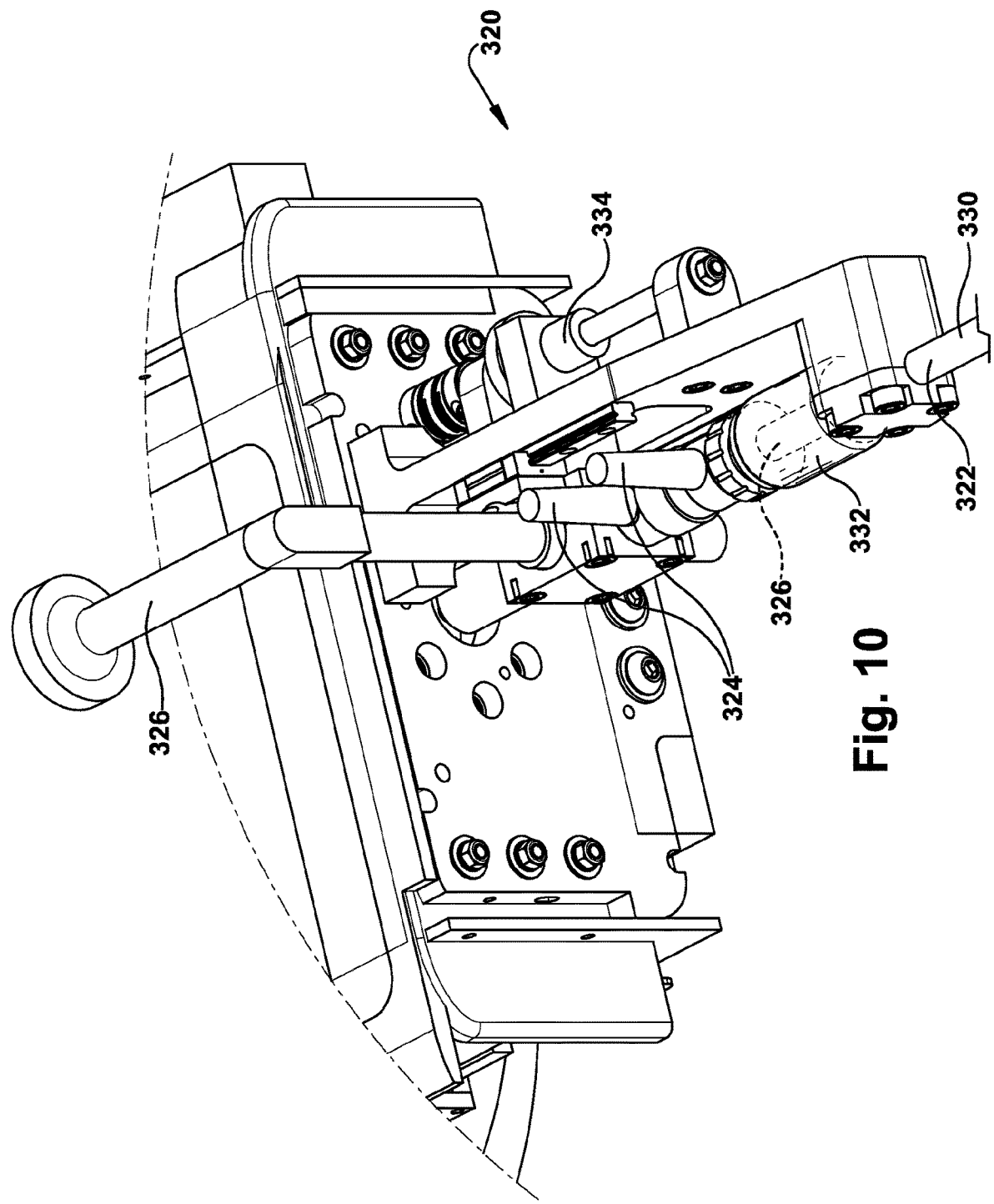
FIG. 10 illustrates an example configuration of an endoscope that can be implemented in the apparatus.

FIG. 10 illustrates an endoscope 320 that includes some customization for facilitating some of the functionality described herein. The endoscope 320 can have many features and similarities to a commercial, off-the-shelf endoscope product. In fact, the endoscope 320 can begin as a commercial endoscope that is retrofitted to provide some customized functionality. The endoscope 320 includes an outer sheath or endoscope tube 322 that can carry/deliver to the surgical site a camera and optics as described above. The endoscope tube 320 can also carry/deliver to the surgical site one or more concentric tube manipulators 12 in any combination and having any configuration disclosed herein. The endoscope 320 can even carry/deliver concentric tube manipulators other than those disclosed herein or any other instrument capable of being delivered endoscopically.

The endoscope 320 includes irrigation channels 324 for delivering fluids to, and removing fluids from, the surgical site. For example, in the example urethra to bladder anastomosis, the bladder is filled with saline solution to open up and enable visualization of the surgical site. These irrigation channels 322 can be standard features of a commercial endoscope product. The endoscope also includes an optics port 326 through which the camera and illumination features are accessed. The irrigation channels 324 and optics port 326 are components of a rigid assembly 328 to which the endoscope tube is connected. To prevent damage/contamination of the optics, the optics port 326 is sealed from the interior of the endoscope tube 322 and the irrigation that takes place therethrough.

Because the concentric tube manipulators 12 implemented in the system 10 and delivered via the endoscope 320 implement a curved concentric tube configuration, maneuvering the tips of the manipulators to perform a surgical procedure necessarily involves extending, retracting, and rotating the tubes. As an inherent result of their configurations, achieving the desired tip maneuvers can necessarily involve extending the tubes a significant distance from the distal end 330 of the endoscope 320. The optics (camera and lights), however, remain fixed in their position at the distal end 330 of the endoscope 320. As a result, viewing the surgical site can be difficult due to the distance between the manipulator tips and the distal end 330 of the endoscope 320.

Advantageously, the endoscope 320 of FIG. 10 is configured to facilitate extending the optics from the distal end 330 in order to position the optics closer to the surgical site. At the same time, the concentric tube manipulators 12 are allowed to exit the endoscope 320 at the distal end 330 so that they can be telescoped and rotated in order to produce the tip movements necessary to perform the surgical procedure. Doing so, however, requires that the endoscope tube 322 remains stationary while the optics telescope from the endoscope tube.

To produce the relative movement between the optics and the endoscope tube 322, the endoscope tube is de-coupled from the irrigation ports 324 and optics port 326. The irrigation and optics ports 324, 326 are mounted on a linear actuator 334. The actuator 334 is configured to robotically translate irrigation ports 324 and optics ports 326 axially relative to the endoscope tube 322 and the items therein, such as the guide channels and the concentric tube manipulators. This configuration allows the optics to extend from the distal end 330 of the endoscope tube 322, and to retract into the endoscope tube 322.

Translating the irrigation and optics ports 324, 326 relative to the endoscope tube 322 in this manner while the other structures inside the tube remain fixed is facilitated by a deformable cylindrical sleeve 332 that connects the irrigation ports 324 to the endoscope tube 322 and through which the optics port 326 extends. The sleeve 332 is constructed of an elastic material, such as a rubber or polymer material, that can be stretched and compressed. With one end connected to the endoscope tube 322 and the other end connected to the assembly 328, the sleeve 332 provides an inner lumen that facilitates irrigation via the irrigation ports 324 and the passing through of the optics port 326. As the ports 324, 326 are telescoped in and out by the actuator 334, the sleeve 332 can stretch and compress in order to maintain the connection in a leak-proof manner.

Articulated Optics

Figure 11:
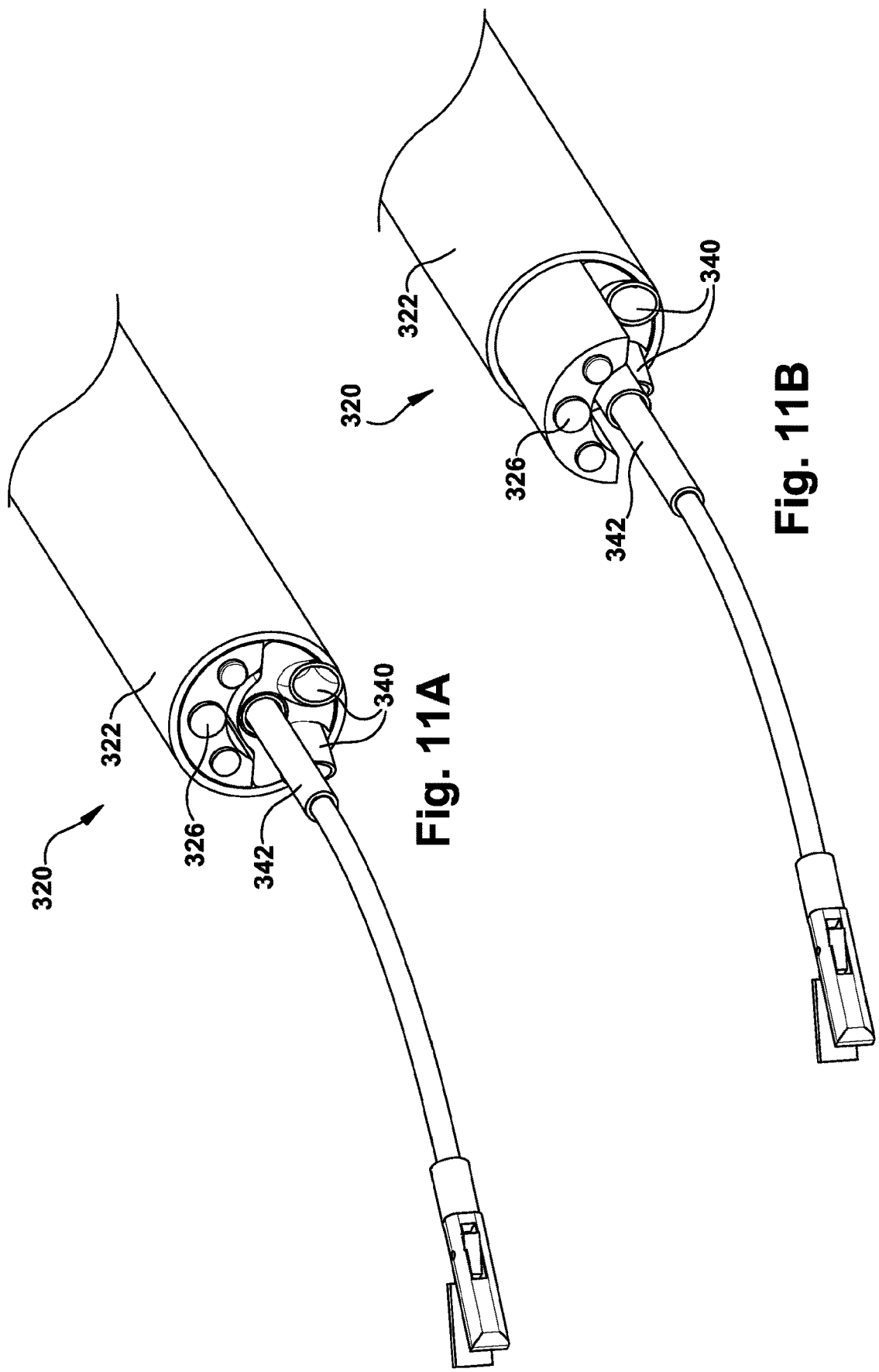
FIGS. 11A-11B illustrate an example configuration of an optics port that can be implemented in the endoscope of FIG. 10.

FIGS. 11A-B illustrate a first configuration of articulated optics that can be facilitated by the actuatable endoscope configuration illustrated in FIG. 10 and described in reference thereto. As shown, the optics port 326 can retract flush with the distal end 330 of the endoscope tube 322 (see, FIG. 11A) and can extend distally from the distal end of the endoscope tube (see, FIG. 11B). In this configuration, the curved guide channels 340 can remain positioned stationary at or near the distal end 330, while the manipulator guide channel 342 can telescope with the optics 326. Alternatively all of the guide channels can remain stationary.

Figure 12:
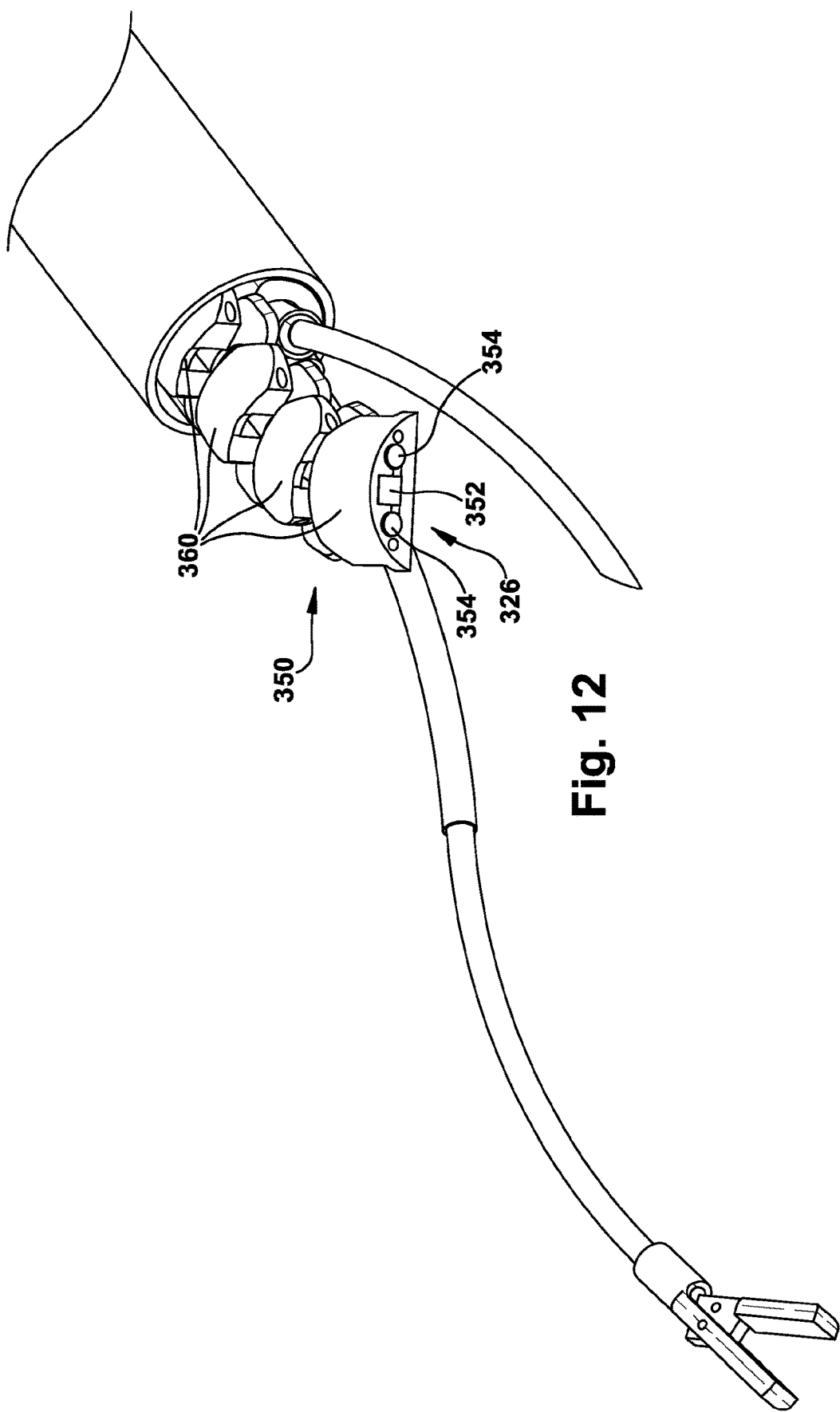
FIG. 12 illustrates an example configuration of an articulated optics port that can be implemented in the endoscope of FIG. 10.

FIG. 12 illustrates an alternative to the conventional endoscope optics 326 implemented in the configuration of FIGS. 11A-B. In FIG. 12, an articulated optics structure 350 carries at its tip a chip camera 352 and illumination sources 354. The articulated optics structure 350 includes segments 360 that are connected to each other via joints that allow for pivoting movement of the segments relative to each other. The relative positions of the segments can be actuated via one or more actuator members (e.g., wire, cable, etc.) that can push/pull to pivot the segments about the joints that connect them. The optics structure 350 can enable steering the view in left-right and/or up-down directions in order to enhance visualization at the surgical site.

We claim:

1. A surgical system for suturing a first anatomical structure to a second anatomical structure of a subject, comprising:

an endoscope tube configured to be advanced through a lumen of the first anatomical structure to a surgical site near the second anatomical structure;

a manipulator arm that extends through the endoscope tube to the surgical site, the manipulator arm comprising a first concentric tube manipulator including an end effector configured to grasp and manipulate a suture at the surgical site;

a needle arm that extends through the endoscope tube to the surgical site, the needle arm comprising a second concentric tube manipulator including a needle tip configured to pierce the tissue of the first and second anatomical structures, the needle arm also being configured to grasp the suture and to retract and pull the suture through the pierced tissue so that the suture extends through and forms stitching that stitches together the first and second anatomical structures.

2. The surgical system recited in claim 1, wherein the manipulator arm is configured to grasp the suture and pull on the suture to draw together portions of the first and second anatomical structures and tighten the stitching.

3. The surgical system recited in claim 1, wherein the needle arm is configured to pierce through the tissue of the first anatomical structure from within the lumen of the first anatomical structure, the needle arm exiting the first anatomical structure and being positioned outside the second anatomical structure, wherein the needle arm is further configured to pierce the second anatomical structure and enter second anatomical structure from outside the second anatomical structure.

4. The surgical system recited in claim 1, wherein the needle arm is configured to follow a pre-curved path and extend from the endoscope tube when piercing the tissue of the first and second anatomical structures, and to follow the same curved path and retract into the endoscope tube when pulling the suture through the pierced tissue.

5. The surgical system recited in claim 1, wherein the manipulator arm is configured to hold the suture after the needle arm pulls the suture through the pierced tissue while the needle arm pierces through the first and second anatomical structures at different locations, the manipulator arm being configured to manipulate the suture so that the needle arm can grasp the end of the suture and pull the suture through the anatomical structures at the different locations to form another stitch that stitches together the first and second anatomical structures.

6. The surgical system recited in claim 1, wherein the stitch is configured to connect the lumen of the first anatomical structure to at least one of a lumen, opening, or ostium of the second anatomical structure.

7. The surgical system recited in claim 1, wherein the first anatomical structure comprises a urethra and the second anatomical structure comprises a bladder, and wherein the stitching is configured to connect a lumen of the urethra to an ostium of the bladder.

8. The surgical system recited in claim 1, wherein the needle tip of the needle arm comprises a hollow tube with a sharpened tip, wherein the hollow tube houses a snare for grasping the suture.

9. The surgical system recited in claim 8, wherein the snare comprises a lasso or grasper.

10. The surgical system recited in claim 1, wherein aligned openings through the sidewall of the hollow tube forming the needle tip of the needle arm form a snare configured to grasp the suture.

11. The surgical system recited in claim 1, wherein the needle arm comprises a chamfered block that is seated in and occupies a notch formed at the needle tip of the needle arm, the block being actuatable to extend from the notch and retract into the notch, wherein, in a retracted position, the block closes the notch and helps define the needle tip and, in an extended position, the block extends forward and opens the notch, wherein the block is retractable to clamp down on and retain an item in the notch.

12. The surgical system recited in claim 1, wherein the needle arm comprises grasping jaws that form the needle tip for suturing tissue when in a closed condition, the grasping jaws having an open condition for receiving items therebetween and being configured to grasp the item when placed in the closed condition.

13. The surgical system recited in claim 1, wherein the end effector of the manipulator arm comprises a pair of grasper arms that are biased toward an open condition, wherein the graspers when extended from the manipulator arm place the graspers in an open condition, and wherein the graspers when retracted into the manipulator arm engage the manipulator and are urged toward a closed condition.

14. The surgical system recited in claim 1, further comprising guide tubes that extend through the endoscope tube and through which the manipulator arm and needle arm extend.

15. The surgical system recited in claim 14, wherein the first and second guide tubes have portions extending within the endoscope tube that follow a helical path configured to facilitate rotation of the guide tubes within the endoscope tube without affecting the positions of their respective distal ends positioned at the tip of the endoscope tube.

16. The surgical system recited in claim 1, further comprising at least one curved guide tube comprising a curved distal end that protrudes from a distal end of the endoscope tube and is curved away from a central axis of the endoscope tube to guide the needle arm to extend from the endoscope tube in a direction that is outward with respect to the central axis.

17. The surgical system recited in claim 16, wherein the at least one curved guide tube comprises first and second guide tubes that protrude from the distal end of the endoscope tube and are curved away from a central axis of the endoscope tube in opposite directions to guide the needle arm to extend from the endoscope tube in opposite directions that are outward with respect to the central axis.

18. The surgical system recited in claim 1, further comprising an endoscope of which the endoscope tube is a portion, wherein the endoscope further comprises a camera for viewing the surgical site and an illumination source for illuminating the surgical site.

19. The surgical system recited in claim 18, wherein the endoscope further comprises an optics port that carries the camera and illumination source, wherein the optics port is extendable from a distal end of the endoscope to adjust the point-of-view of the camera.

20. The surgical system recited in claim 1, further comprising a suture delivery device comprising a tube with a lumen configured to receive the suture and retain the suture for delivery endoscopically to the surgical site, wherein the suture delivery device is configured to receive a leading end of the suture in a delivery device lumen, and to secure an anchor end of the suture to retain the suture in the lumen during delivery.

21. The surgical system recited in claim 1, wherein each of the first and second concentric tube manipulators comprises two or more tubes that are nested inside each other and configured to produce movement at a tip of the concentric tube manipulator through relative rotation and/or translation of the two or more tubes.

* * * * *